(12) United States Patent
Hadi et al.

(10) Patent No.: US 10,145,993 B1
(45) Date of Patent: Dec. 4, 2018

(54) RETROREFLECTORS PROVIDING INFORMATION ENCODED IN REFLECTED NON-VISIBLE LASER WHILE RETAINING VISIBLE LIGHT SAFETY PROPERTIES

(71) Applicant: LIGHTHOUSE & BEACON, INC., San Diego, CA (US)

(72) Inventors: Sura Hadi, San Diego, CA (US); William Davis, San Diego, CA (US); Michael John Bosworth Roberts, San Diego, CA (US); Michalyn Andrews, La Jolla, CA (US)

(73) Assignee: LIGHTHOUSE & BEACON, INC., Los Angeles, CA (US)

( * ) Notice: Subject to any disclaimer, the term of this patent is extended or adjusted under 35 U.S.C. 154(b) by 0 days.

(21) Appl. No.: 15/862,408

(22) Filed: Jan. 4, 2018

Related U.S. Application Data

(60) Provisional application No. 62/569,396, filed on Oct. 6, 2017.

(51) Int. Cl.
| | |
|---|---|
| *E01F 9/00* | (2016.01) |
| *G01S 17/02* | (2006.01) |
| *G02B 5/12* | (2006.01) |
| *G08G 1/09* | (2006.01) |
| *H04B 10/10* | (2006.01) |
| *E01F 9/553* | (2016.01) |
| *H04B 10/112* | (2013.01) |

(52) U.S. Cl.
CPC ................ *G02B 5/12* (2013.01); *E01F 9/553* (2016.02); *G01S 17/02* (2013.01); *G08G 1/09* (2013.01); *H04B 10/112* (2013.01)

(58) Field of Classification Search
CPC .......... G02B 5/12; G02B 5/136; E01F 9/553; G01S 17/02; G08G 1/09; H04B 10/112
USPC ......................... 359/534, 546, 547, 551, 552
See application file for complete search history.

(56) References Cited

U.S. PATENT DOCUMENTS

| | | | |
|---|---|---|---|
| 4,834,531 A * | 5/1989 | Ward ..................... | B64G 1/646 244/172.4 |
| 5,202,742 A * | 4/1993 | Frank .................... | G01S 7/4811 180/167 |
| 5,357,371 A | 10/1994 | Minott | |
| 5,805,286 A * | 9/1998 | Voegler .................. | G01S 17/87 356/614 |
| 6,154,299 A | 11/2000 | Gilbreath et al. | |

(Continued)

FOREIGN PATENT DOCUMENTS

| | | |
|---|---|---|
| KR | 20170021394 A | 2/2017 |
| KR | 101720163 B1 | 3/2017 |

OTHER PUBLICATIONS

2009 Edition Chapter 3F. Delineators. U.S. Department of Transportation. Federal Highway Administration Research and Technology. Available at https://mutcd.fhwa.dot.gov/htm/2009r1r2/part3/part3f.htm (4 pgs.) (Modified Feb. 2017).

(Continued)

*Primary Examiner* — Frank Font
(74) *Attorney, Agent, or Firm* — Wilson Sonsini Goodrich & Rosati

(57) ABSTRACT

Described are retroreflective marker devices, which encode information that can be read by optical sensors, such as LiDAR devices, and that do not detract from human safety. Also described are kits for retrofitting existing markers.

30 Claims, 10 Drawing Sheets

(56) References Cited

U.S. PATENT DOCUMENTS

| | | | |
|---|---|---|---|
| 8,228,582 | B1 | 7/2012 | Pepper et al. |
| 8,253,932 | B1* | 8/2012 | Cole .................. G01N 21/41 356/128 |
| 8,379,286 | B2 | 2/2013 | Klotzkin et al. |
| 9,316,593 | B2* | 4/2016 | Switkes ................ G01N 21/78 |
| 9,596,611 | B2 | 3/2017 | Berry et al. |
| 2007/0297805 | A1 | 12/2007 | Rabinovich et al. |
| 2012/0099199 | A1* | 4/2012 | Vasylyev ......... B29D 11/00278 359/530 |
| 2012/0140224 | A1* | 6/2012 | Switkes ................ G01N 21/78 356/369 |
| 2014/0197955 | A1 | 7/2014 | Martin et al. |
| 2015/0003909 | A1 | 1/2015 | Martin et al. |
| 2015/0161889 | A1 | 6/2015 | Martin et al. |

OTHER PUBLICATIONS

Associate Press. Autonomous cars with no human backup could hit public roads for the first time next year in historic trial. Available at http://www.dailymail.co.uk/sciencetech/article-4580522/Delphi-Transdev-partner-self-driving-buses.html (21 pgs.) (Jun. 7, 2017).

Bizjak. California drivers: Say goodbye to the Botts Dot, the bump that made your car go thump. The Sacramento Bee. Available at http://www.sacbee.com/news/local/transportation/article127811959.html (10 pgs) (Jan. 20, 2017).

Guidelines for the Use of Raised Pavement Markers. Section 2. RPM Guidelines (Publication No. FHWA-RD-97-152). U.S. Department of Transportation. Federal Highway Administration Research and Technology. Available at https://www.fhwa.dot.gov/publications/research/safety/97152/ch02.cfm (18 pgs.) (2016).

Karpinski et al. Sensor Networks for Smart Roads. Available at https://pdfs.semanticscholar.org/152f/4c28df02e35f658027c4dccb1322ec04efe6.pdf (5 pgs) (Accessed 2017).

Millward. Smart cats' eyes to make roads safer. The Telegraph. Available at http://www.telegraph.co.uk/news/1524657/Smart-cats-eyes-to-make-roads-safer.html (1 pg.) (Jul. 24, 2006).

SolarBright PATeye. Available at http://www.solarbright.co.nz/products/pateye-real-time-ice-detection-stud/ (1pg.) (2017).

SolarBright. Solar Road Stud brochure. Available at http://www.solarbright.co.nz/assets/ProductPDFs/merged-document.pdf (2 pgs.) (Accessed Oct. 2017).

Retroreflective sheeting. https://en.m.wikipedia.org/wiki/Retroreflective_sheeting (4 pgs) (Edited Jul. 2018).

* cited by examiner

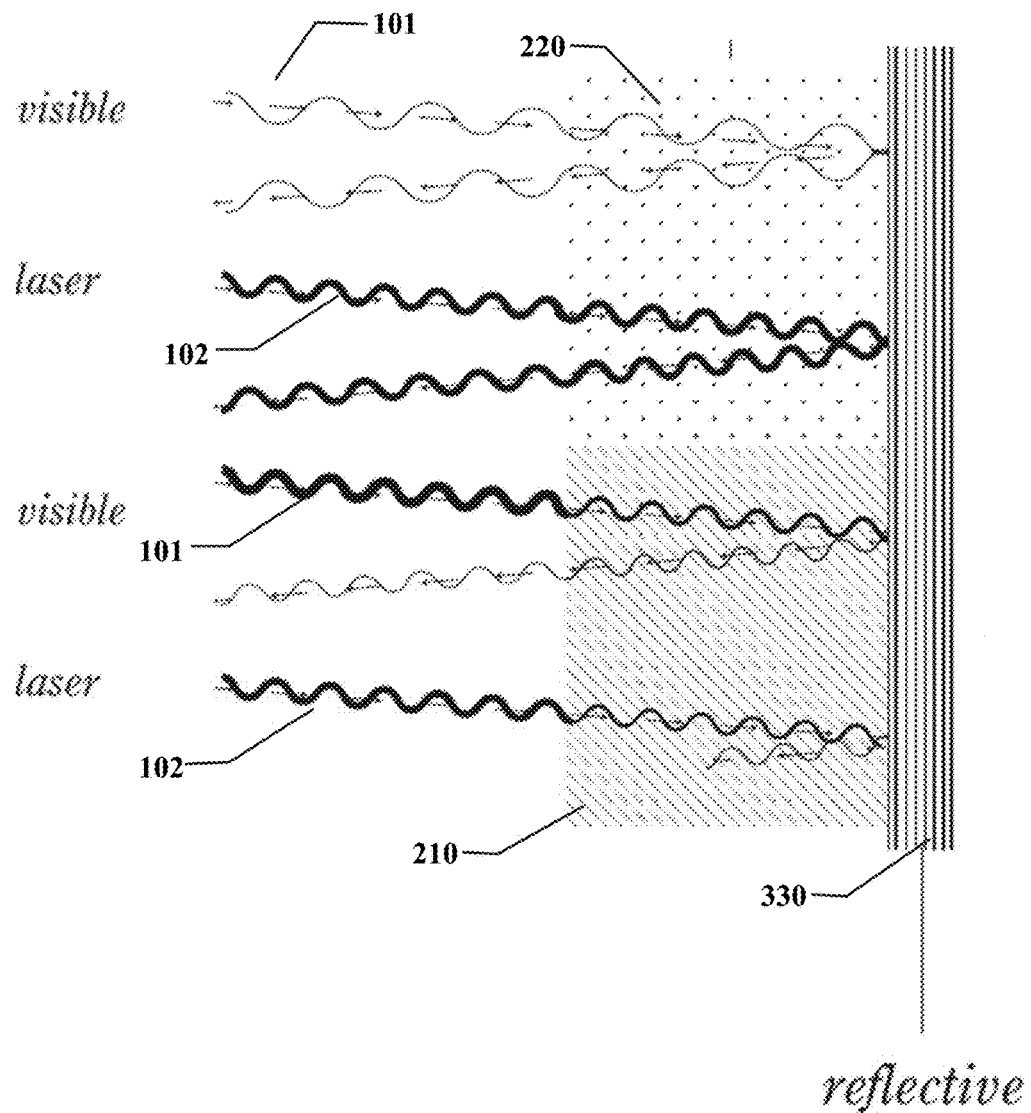

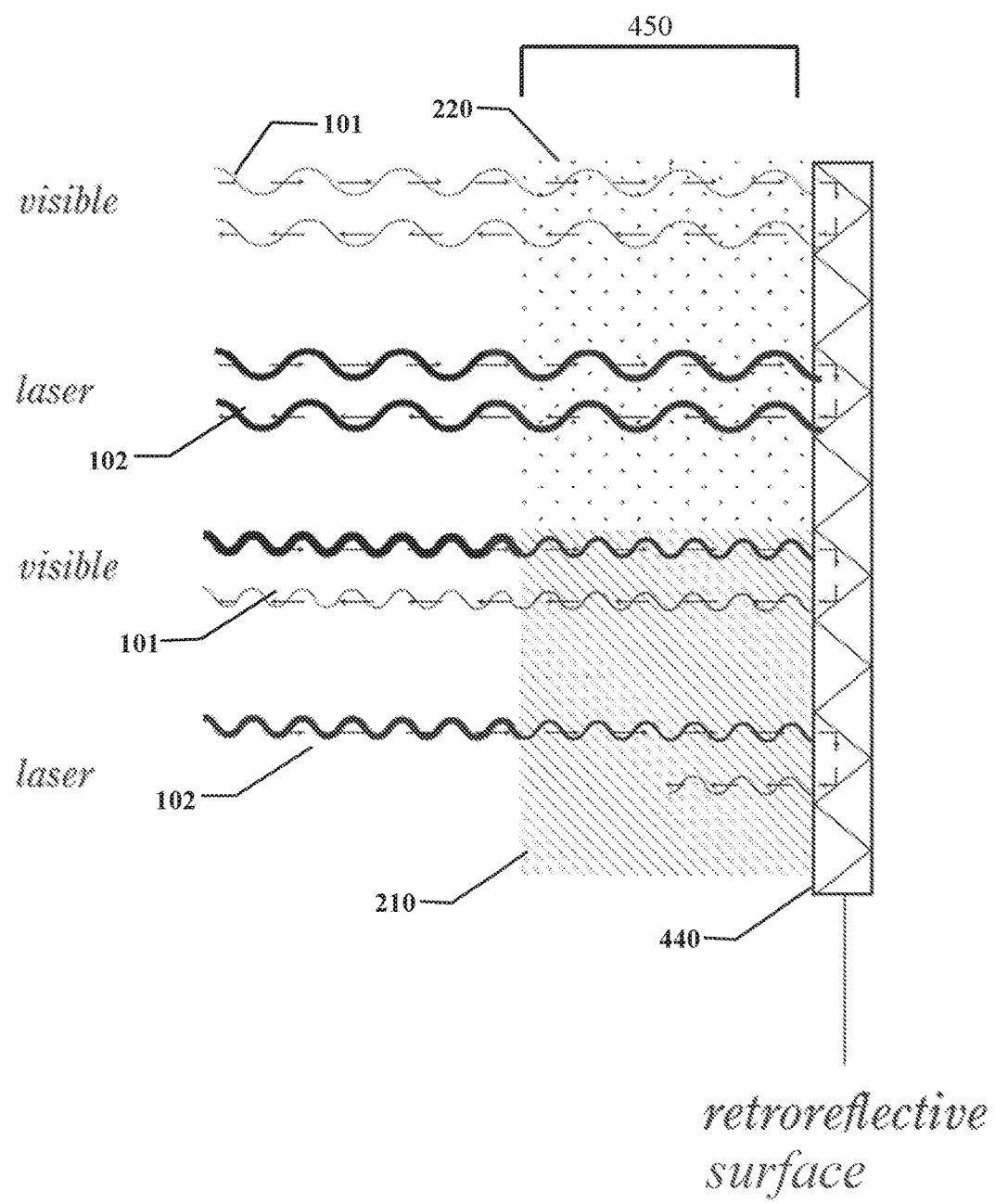

*visible to human eye*

*visible to LIDAR*

RETROREFLECTORS PROVIDING INFORMATION ENCODED IN REFLECTED NON-VISIBLE LASER WHILE RETAINING VISIBLE LIGHT SAFETY PROPERTIES

CROSS-REFERENCE TO RELATED APPLICATIONS

This application claims the benefit of U.S. Provisional Application No. 62/569,396, filed Oct. 6, 2017, which is hereby incorporated by reference.

BACKGROUND OF THE INVENTION

Raised pavement markers, convex vibration lines, Botts' dots, delineators, cat's eyes, road studs, or road turtles are commonly used as safety device in such commercial structures as roads, highways, buoys, docks, and runways. Raised reflective markers include materials and structures that enhance their visibility by reflecting headlights to alert a driver of locations, zones, lanes, and other route features.

SUMMARY OF THE INVENTION

Current reflective markers have been developed to reflect visible light emitted from the headlights of a vehicle back to a driver, to alert the driver of locations, zones, lanes, and other passage features based off their color or tint. Additionally, road signs and decals have long been employed to visually alert and communicate information to a driver.

Autonomous vehicles (also known as driverless, self-driving, robotic and unmanned vehicles are capable of navigating without human input by sensing and responding to its environment. Autonomous cars use a variety of techniques to detect their surroundings such as radar, laser light, GPS, odometry, and computer vision, wherein advanced control systems interpret sensory information to identify obstacles and relevant signage and calculate an appropriate navigation path.

Although autonomous vehicles have been programmed to sense road markers and read street signs designed for human eyes, a significant amount of data processing and sensor overlap is required to detect and garner information from such sources during the day and night, and under varying forms of light and shade.

Although the use of additional signs and sign demarcations could improve the ability of an autonomous vehicle to detect and navigate byways, such features may prove distracting and unsightly to human drivers, residents, and pedestrians. As such there is a current unmet need for a device which encodes information that can be read by the sensors of an autonomous car, into elements within the current infrastructure, that do not detract from the safety of human drivers. Further, as many current signs and marking elements currently exist throughout the infrastructures of the cities around the world, there additionally exists a current unmet need for devices, kits, and methods to retrofit current signs and demarcations to include additional data for autonomous vehicles.

In one aspect, disclosed herein is a reflective marker device comprising: a retroreflective surface and a lens covering the retroreflective surface to form one or more faces; the face comprising a plurality of regions, the plurality of regions comprising at least a region of a first type and a region of a second type; the region of the first type comprising a first filter embedded in the lens, the first filter attenuating a first laser outside the visible wavelength spectrum incident on the face; the region of the second type lacking the first filter and reflecting the first laser incident on the face to its source; wherein both the region of the first type and the region of the second type reflect light within the visible wavelength spectrum incident on the face to its source; and wherein the first laser incident on the face is reflected to its source as a first pattern, the first pattern comprising encoded information.

In some embodiments, the device comprises 2, 3, 4, 5, 6, 7, 8, 9, 10, or more regions of the first type. In some embodiments, the number of regions of the first type is about 1 to about 50. In some embodiments, the number of regions of the first type is at least about 1. In some embodiments, the number of regions of the first type is at most about 50. In various embodiments, the number of regions of the first type is about 1 to about 2, about 1 to about 5, about 1 to about 10, about 1 to about 15, about 1 to about 20, about 1 to about 25, about 1 to about 30, about 1 to about 40, about 1 to about 50, about 2 to about 5, about 2 to about 10, about 2 to about 15, about 2 to about 20, about 2 to about 25, about 2 to about 30, about 2 to about 40, about 2 to about 50, about 5 to about 10, about 5 to about 15, about 5 to about 20, about 5 to about 25, about 5 to about 30, about 5 to about 40, about 5 to about 50, about 10 to about 15, about 10 to about 20, about 10 to about 25, about 10 to about 30, about 10 to about 40, about 10 to about 50, about 15 to about 20, about 15 to about 25, about 15 to about 30, about 15 to about 40, about 15 to about 50, about 20 to about 25, about 20 to about 30, about 20 to about 40, about 20 to about 50, about 25 to about 30, about 25 to about 40, about 25 to about 50, about 30 to about 40, about 30 to about 50, or about 40 to about 50. In various particular embodiments, the number of regions of the first type is about 1, about 2, about 5, about 10, about 15, about 20, about 25, about 30, about 40, or about 50, including increments therein.

In some embodiments, the reflective marker device comprises 2, 3, 4, 5, 6, 7, 8, 9, 10, or more regions of the second type. In some embodiments, the number of regions of the second type is about 1 to about 50. In some embodiments, the number of regions of the second type is at least about 1. In some embodiments, the number of regions of the second type is at most about 50. In various embodiments, the number of regions of the second type is about 1 to about 2, about 1 to about 5, about 1 to about 10, about 1 to about 15, about 1 to about 20, about 1 to about 25, about 1 to about 30, about 1 to about 40, about 1 to about 50, about 2 to about 5, about 2 to about 10, about 2 to about 15, about 2 to about 20, about 2 to about 25, about 2 to about 30, about 2 to about 40, about 2 to about 50, about 5 to about 10, about 5 to about 15, about 5 to about 20, about 5 to about 25, about 5 to about 30, about 5 to about 40, about 5 to about 50, about 10 to about 15, about 10 to about 20, about 10 to about 25, about 10 to about 30, about 10 to about 40, about 10 to about 50, about 15 to about 20, about 15 to about 25, about 15 to about 30, about 15 to about 40, about 15 to about 50, about 20 to about 25, about 20 to about 30, about 20 to about 40, about 20 to about 50, about 25 to about 30, about 25 to about 40, about 25 to about 50, about 30 to about 40, about 30 to about 50, or about 40 to about 50. In various particular embodiments, the number of regions of the second type is about 1, about 2, about 5, about 10, about 15, about 20, about 25, about 30, about 40, or about 50, including increments therein.

In some embodiments, the face is substantially planar.

In some embodiments, the reflective marker device comprises 2, 3, 4, or 5 faces. In some embodiments, the number of face is about 1 to about 50. In some embodiments, the number of face is at least about 1. In some embodiments, the number of face is at most about 50. In various embodiments, the number of face is about 1 to about 2, about 1 to about 5, about 1 to about 10, about 1 to about 15, about 1 to about 20, about 1 to about 25, about 1 to about 30, about 1 to about 40, about 1 to about 50, about 2 to about 5, about 2 to about 10, about 2 to about 15, about 2 to about 20, about 2 to about 25, about 2 to about 30, about 2 to about 40, about 2 to about 50, about 5 to about 10, about 5 to about 15, about 5 to about 20, about 5 to about 25, about 5 to about 30, about 5 to about 40, about 5 to about 50, about 10 to about 15, about 10 to about 20, about 10 to about 25, about 10 to about 30, about 10 to about 40, about 10 to about 50, about 15 to about 20, about 15 to about 25, about 15 to about 30, about 15 to about 40, about 15 to about 50, about 20 to about 25, about 20 to about 30, about 20 to about 40, about 20 to about 50, about 25 to about 30, about 25 to about 40, about 25 to about 50, about 30 to about 40, about 30 to about 50, or about 40 to about 50. In various particular embodiments, the number of face is about 1, about 2, about 5, about 10, about 15, about 20, about 25, about 30, about 40, or about 50, including increments therein.

In some embodiments, each face is substantially planar. In some embodiments, the first laser has a wavelength in the near infrared wavelength spectrum.

In some embodiments, the first laser has a wavelength between 893 nm and 913 nm. In some embodiments, the first laser has a wavelength about 890 nm to about 915 nm. In some embodiments, the first laser has a wavelength at least about 890 nm. In some embodiments, the first laser has a wavelength at most about 915 nm. In various embodiments, the first laser has a wavelength about 890 nm to about 895 nm, about 890 nm to about 900 nm, about 890 nm to about 905 nm, about 890 nm to about 210 nm, about 890 nm to about 915 nm, about 895 nm to about 900 nm, about 895 nm to about 905 nm, about 895 nm to about 210 nm, about 895 nm to about 915 nm, about 900 nm to about 905 nm, about 900 nm to about 210 nm, about 900 nm to about 915 nm, about 905 nm to about 210 nm, about 905 nm to about 915 nm, or about 210 nm to about 915 nm. In various particular embodiments, the first laser has a wavelength about 890 nm, about 895 nm, about 900 nm, about 905 nm, about 210 nm, or about 915 nm, including increments therein. In some embodiments, the first laser has a wavelength between 1540 nm and 1560 nm. In some embodiments, the first laser has a wavelength about 1,540 nm to about 1,560 nm. In some embodiments, the first laser has a wavelength at least about 1,540 nm. In some embodiments, the first laser has a wavelength at most about 1,560 nm. In various embodiments, the first laser has a wavelength about 1,540 nm to about 1,545 nm, about 1,540 nm to about 1,550 nm, about 1,540 nm to about 1,555 nm, about 1,540 nm to about 1,560 nm, about 1,545 nm to about 1,550 nm, about 1,545 nm to about 1,555 nm, about 1,545 nm to about 1,560 nm, about 1,550 nm to about 1,555 nm, about 1,550 nm to about 1,560 nm, or about 1,555 nm to about 1,560 nm. In various particular embodiments, the first laser has a wavelength about 1,540 nm, about 1,545 nm, about 1,550 nm, about 1,555 nm, or about 1,560 nm, including increments therein.

In some embodiments, the first filter comprises an absorptive dye, a polarizing filter, an interference filter, a physical filter, or any combination thereof. In some embodiments, the first filter consists of an absorptive dye. In some embodiments, the lens is polycarbonate. In some embodiments, the lens is glass.

In some embodiments, the encoded information in the first pattern is spatially encoded. In some embodiments, the spatial encoding comprises a one-dimensional encoding, a two-dimensional encoding, a three-dimensional encoding, or any combination thereof. In some embodiments, the spatial encoding comprises a three-dimensional encoding, wherein the marker device comprises a plurality of faces, and wherein a distance between at least two of the plurality of faces encodes information. In some embodiments, the spatial encoding comprises a QR code, a bar code, a pattern, an array, a two-dimensional shape, a three-dimensional shape, a number, a letter, a symbol, or any combination thereof. In some embodiments, the reflective marker device of comprises a plurality of faces, wherein at least two of the plurality of faces are non-coplanar. In some embodiments, the at least two non-coplanar faces are parallel. In some embodiments, the at least two non-coplanar faces are offset by an offset distance of about 0.01 inches to about 3 inches. In some embodiments, the at least two non-coplanar faces are offset by an offset distance of at least about 0.01 inches. In some embodiments, the at least two non-coplanar faces are offset by an offset distance of at most about 3 inches. In some embodiments, the at least two non-coplanar faces are offset by an offset distance of about 0.01 inches to about 0.02 inches, about 0.01 inches to about 0.05 inches, about 0.01 inches to about 0.1 inches, about 0.01 inches to about 0.2 inches, about 0.01 inches to about 0.5 inches, about 0.01 inches to about 1 inch, about 0.01 inches to about 2 inches, about 0.01 inches to about 3 inches, about 0.02 inches to about 0.05 inches, about 0.02 inches to about 0.1 inches, about 0.02 inches to about 0.2 inches, about 0.02 inches to about 0.5 inches, about 0.02 inches to about 1 inch, about 0.02 inches to about 2 inches, about 0.02 inches to about 3 inches, about 0.05 inches to about 0.1 inches, about 0.05 inches to about 0.2 inches, about 0.05 inches to about 0.5 inches, about 0.05 inches to about 1 inch, about 0.05 inches to about 2 inches, about 0.05 inches to about 3 inches, about 0.1 inches to about 0.2 inches, about 0.1 inches to about 0.5 inches, about 0.1 inches to about 1 inch, about 0.1 inches to about 2 inches, about 0.1 inches to about 3 inches, about 0.2 inches to about 0.5 inches, about 0.2 inches to about 1 inch, about 0.2 inches to about 2 inches, about 0.2 inches to about 3 inches, about 0.5 inches to about 1 inch, about 0.5 inches to about 2 inches, about 0.5 inches to about 3 inches, about 1 inch to about 2 inches, about 1 inch to about 3 inches, or about 2 inches to about 3 inches. In some embodiments, the at least two non-coplanar faces are offset by an offset distance of about 0.01 inches, about 0.02 inches, about 0.05 inches, about 0.1 inches, about 0.2 inches, about 0.5 inches, about 1 inch, about 2 inches, or about 3 inches.

In some embodiments, the offset distance encodes information. In some embodiments, the encoded information is non-temporally encoded. In some embodiments, the encoded information is navigational information. In some embodiments, the navigational information comprises a speed limit, a direction of travel, a location, or any combination thereof. In some embodiments, the encoded information is non-navigational information. In some embodiments, the navigational information comprises advertising information.

In some embodiments, the device is passive. In some embodiments, the device is non-mechanical. In some embodiments, the device is non-electronic. In some embodiments, the device is a road marker, a road sign, or a vehicle marker. In some embodiments, the device is an aviation runway marker or an aircraft marker. In some embodiments, the device is a shipping lane marker, a ship marker, or a shipping container marker. In some embodiments, the device is a residential structure marker, a retail structure marker, a parking structure marker, or a warehouse marker.

In some embodiments, the device further comprises a region of a third type comprising a second filter embedded in the lens, the second filter attenuating a second laser having a wavelength outside the visible spectrum and different than that of the first laser incident on the face and reflecting light having a wavelength within the visible spectrum incident on the face to its source such that the second laser incident on the face is reflected to its source as a second pattern, the second pattern comprising encoded information. In some embodiments, the second laser has a wavelength in the near infrared wavelength spectrum. In some embodiments, the second laser has a wavelength between 893 nm and 913 nm. In some embodiments, the second laser has a wavelength between 1540 nm and 1560 nm. In some embodiments, the second filter comprises an absorptive dye, a polarizing filter, an interference filter, a physical filter, or any combination thereof.

In some embodiments, the reflective marker device has a width, length or depth of about 0.25 inches to about 50 inches. In some embodiments, the reflective marker device has a width, length or depth of at least about 0.25 inches. In some embodiments, the reflective marker device has a width, length, or depth of at most about 50 inches. In various embodiments, the reflective marker device has a width, length, or depth of about 0.25 inches to about 0.5 inches, about 0.25 inches to about 0.75 inches, about 0.25 inches to about 1 inch, about 0.25 inches to about 2 inches, about 0.25 inches to about 5 inches, about 0.25 inches to about 10 inches, about 0.25 inches to about 15 inches, about 0.25 inches to about 20 inches, about 0.25 inches to about 30 inches, about 0.25 inches to about 40 inches, about 0.25 inches to about 50 inches, about 0.5 inches to about 0.75 inches, about 0.5 inches to about 1 inch, about 0.5 inches to about 2 inches, about 0.5 inches to about 5 inches, about 0.5 inches to about 10 inches, about 0.5 inches to about 15 inches, about 0.5 inches to about 20 inches, about 0.5 inches to about 30 inches, about 0.5 inches to about 40 inches, about 0.5 inches to about 50 inches, about 0.75 inches to about 1 inch, about 0.75 inches to about 2 inches, about 0.75 inches to about 5 inches, about 0.75 inches to about 10 inches, about 0.75 inches to about 15 inches, about 0.75 inches to about 20 inches, about 0.75 inches to about 30 inches, about 0.75 inches to about 40 inches, about 0.75 inches to about 50 inches, about 1 inch to about 2 inches, about 1 inch to about 5 inches, about 1 inch to about 10 inches, about 1 inch to about 15 inches, about 1 inch to about 20 inches, about 1 inch to about 30 inches, about 1 inch to about 40 inches, about 1 inch to about 50 inches, about 2 inches to about 5 inches, about 2 inches to about 10 inches, about 2 inches to about 15 inches, about 2 inches to about 20 inches, about 2 inches to about 30 inches, about 2 inches to about 40 inches, about 2 inches to about 50 inches, about 5 inches to about 10 inches, about 5 inches to about 15 inches, about 5 inches to about 20 inches, about 5 inches to about 30 inches, about 5 inches to about 40 inches, about 5 inches to about 50 inches, about 10 inches to about 15 inches, about 10 inches to about 20 inches, about 10 inches to about 30 inches, about 10 inches to about 40 inches, about 10 inches to about 50 inches, about 15 inches to about 20 inches, about 15 inches to about 30 inches, about 15 inches to about 40 inches, about 15 inches to about 50 inches, about 20 inches to about 30 inches, about 20 inches to about 40 inches, about 20 inches to about 50 inches, about 30 inches to about 40 inches, about 30 inches to about 50 inches, or about 40 inches to about 50 inches. In various particular embodiments, the reflective marker device has a width, length, or depth of about 0.25 inches, about 0.5 inches, about 0.75 inches, about 1 inch, about 2 inches, about 5 inches, about 10 inches, about 15 inches, about 20 inches, about 30 inches, about 40 inches, or about 50 inches, including increments therein.

A second aspect provided herein is a system comprising: a LiDAR apparatus configured to transmit at least a first laser into an environment, the first laser having a wavelength outside the visible wavelength spectrum; at least one reflective marker device positioned in the environment; wherein the reflective marker device comprises: a retroreflective surface and a lens covering the retroreflective surface to form a face; the face comprising a plurality of regions, the plurality of regions comprising at least a region of a first type and a region of a second type; the region of the first type comprising a first filter associated with the lens, the first filter attenuating the first laser incident on the face; the region of the second type lacking the first filter and reflecting the first laser incident on the face to the LiDAR; wherein both the region of the first type and the region of the second type reflect light within the visible wavelength spectrum incident on the face to its source; and wherein the first laser incident on the face is reflected to the LiDAR as a first pattern, the first pattern comprising encoded information; a receiver positioned within the LiDAR and configured to receive the reflected first laser and the first pattern; and a computer comprising at least one processor configured to decode the encoded information.

In some embodiments, the LiDAR is mounted on an autonomous vehicle. In some embodiments, the reflective marker device comprises 2, 3, 4, 5, 6, 7, 8, 9, 10, or more regions of the first type. In some embodiments, the reflective marker device comprises 2, 3, 4, 5, 6, 7, 8, 9, 10, or more regions of the second type. In some embodiments, the face of the reflective marker device is substantially planar. In some embodiments, the reflective marker device comprises 2, 3, 4, or 5 faces. In some embodiments, each face of the reflective marker device is substantially planar. In some embodiments, the first laser has a wavelength in the near infrared wavelength spectrum. In some embodiments, the first laser has a wavelength between 893 nm and 913 nm. In some embodiments, the first laser has a wavelength between 1540 nm and 1560 nm. In some embodiments, the first filter of the reflective marker comprises an absorptive dye, a polarizing filter, an interference filter, a physical filter, or any combination thereof. In some embodiments, the first filter of the reflective marker consists of an absorptive dye. In some embodiments, the lens of the reflective marker is polycarbonate. In some embodiments, the lens of the reflective marker is glass.

In some embodiments, the encoded information in the first pattern is spatially encoded. In some embodiments, the spatial encoding comprises a one-dimensional encoding, a two-dimensional encoding, a three-dimensional encoding, or any combination thereof. In some embodiments, the spatial encoding comprises a three-dimensional encoding, wherein the marker device comprises a plurality of faces, and wherein a distance between at least two of the plurality of faces encodes information. In some embodiments, the spatial encoding comprises a QR code, a bar code, a pattern, an array, a two-dimensional shape, a three-dimensional shape, a number, a letter, a symbol, or any combination thereof. In some embodiments, the reflective marker device of comprises a plurality of faces, wherein at least two of the plurality of faces are non-coplanar. In some embodiments, the at least two non-coplanar faces are parallel. In some embodiments, the at least two non-coplanar faces are offset by an offset distance of about 0.01 inches to about 3 inches.

In some embodiments, the at least two non-coplanar faces are offset by an offset distance of at least about 0.01 inches. In some embodiments, the at least two non-coplanar faces are offset by an offset distance of at most about 3 inches. In some embodiments, the at least two non-coplanar faces are offset by an offset distance of about 0.01 inches to about 0.02 inches, about 0.01 inches to about 0.05 inches, about 0.01 inches to about 0.1 inches, about 0.01 inches to about 0.2 inches, about 0.01 inches to about 0.5 inches, about 0.01 inches to about 1 inch, about 0.01 inches to about 2 inches, about 0.01 inches to about 3 inches, about 0.02 inches to about 0.05 inches, about 0.02 inches to about 0.1 inches, about 0.02 inches to about 0.2 inches, about 0.02 inches to about 0.5 inches, about 0.02 inches to about 1 inch, about 0.02 inches to about 2 inches, about 0.02 inches to about 3 inches, about 0.05 inches to about 0.1 inches, about 0.05 inches to about 0.2 inches, about 0.05 inches to about 0.5 inches, about 0.05 inches to about 1 inch, about 0.05 inches to about 2 inches, about 0.05 inches to about 3 inches, about 0.1 inches to about 0.2 inches, about 0.1 inches to about 0.5 inches, about 0.1 inches to about 1 inch, about 0.1 inches to about 2 inches, about 0.1 inches to about 3 inches, about 0.2 inches to about 0.5 inches, about 0.2 inches to about 1 inch, about 0.2 inches to about 2 inches, about 0.2 inches to about 3 inches, about 0.5 inches to about 1 inch, about 0.5 inches to about 2 inches, about 0.5 inches to about 3 inches, about 1 inch to about 2 inches, about 1 inch to about 3 inches, or about 2 inches to about 3 inches. In some embodiments, the at least two non-coplanar faces are offset by an offset distance of about 0.01 inches, about 0.02 inches, about 0.05 inches, about 0.1 inches, about 0.2 inches, about 0.5 inches, about 1 inch, about 2 inches, or about 3 inches.

In some embodiments, the encoded information is non-temporally encoded. In some embodiments, the encoded information is navigational information. In some embodiments, the navigational information comprises a speed limit, a direction of travel, a location, or any combination thereof. In some embodiments, the encoded information is non-navigational information. In some embodiments, the non-navigational information comprises advertising information. In some embodiments, the reflective marker is a passive device. In some embodiments, the device is non-mechanical. In some embodiments, the device is non-electronic. In some embodiments, the environment is a road or a vehicle. In some embodiments, the environment is an aviation runway or an aircraft. In some embodiments, the environment is a shipping lane, a ship, or a shipping container. In some embodiments, the environment is a residential structure, a retail structure, a parking structure, or a warehouse. In some embodiments, the LiDAR apparatus is configured to transmit at a second laser into an environment, the second laser having a wavelength outside the visible wavelength spectrum, and wherein the reflective marker further comprises a region of a third type comprising a second filter embedded in the lens, the second filter attenuating a second laser having a wavelength outside the visible spectrum and different than that of the first laser incident on the face and reflecting light having a wavelength within the visible spectrum incident on the face to its source such that the second laser incident on the face is reflected to its source as a second pattern, the second pattern comprising encoded information. In some embodiments, wherein the second laser has a wavelength in the near infrared wavelength spectrum. In some embodiments, the second laser has a wavelength between 893 nm and 913 nm or between 1540 nm and 1560 nm. In some embodiments, the second filter comprises an absorptive dye, a polarizing filter, an interference filter, a physical filter, or any combination thereof.

A third aspect provide herein is a marker lens comprising a plurality of regions, the plurality of regions comprising at least a region of a first type and a region of a second type; the region of the first type comprising a first filter embedded in the lens, the first filter attenuating a first light outside the visible wavelength spectrum incident on the face; the region of the second type lacking the first filter and reflecting the first light incident on the face to its source; wherein both the region of the first type and the region of the second type reflect light within the visible wavelength spectrum incident on the face to its source; and wherein the first light incident on the face is reflected to its source as a first pattern, the first pattern comprising encoded information.

In some embodiments, the marker lens further comprises a fastener capable of fastening the lens to a reflective marker. In some embodiments, the fastener comprises a screw, a nut, a nail, a threaded hole, an unthreaded hole, an adhesive, an epoxy, a crimp, a rivet, a tie, or any combination thereof. In some embodiments, the lens comprises 2, 3, 4, 5, 6, 7, 8, 9, 10, or more regions of the first type. In some embodiments, the lens comprises least 2, 3, 4, 5, 6, 7, 8, 9, or 10 regions of the second type. In some embodiments, the face is substantially planar. In some embodiments, the lens comprises 2, 3, 4, or 5 faces. In some embodiments, each face is substantially planar. In some embodiments, the first light has a wavelength in the near infrared wavelength spectrum. In some embodiments, the first light has a wavelength between 893 nm and 913 nm. In some embodiments, the first light has a wavelength between 1540 nm and 1560 nm. In some embodiments, the first filter comprises an absorptive dye, a polarizing filter, an interference filter, a physical filter, or any combination thereof. In some embodiments, the first filter consists of an absorptive dye. In some embodiments, the lens is polycarbonate. In some embodiments, the lens is glass.

In some embodiments, the encoded information in the first pattern is spatially encoded. In some embodiments, the spatial encoding comprises a one-dimensional encoding, a two-dimensional encoding, a three-dimensional encoding, or any combination thereof. In some embodiments, the spatial encoding comprises a three-dimensional encoding, wherein the marker device comprises a plurality of faces, and wherein a distance between at least two of the plurality of faces encodes information. In some embodiments, the spatial encoding comprises a QR code, a bar code, a pattern, an array, a two-dimensional shape, a three-dimensional shape, a number, a letter, a symbol, or any combination thereof. In some embodiments, the reflective marker device of comprises a plurality of faces, wherein at least two of the plurality of faces are non-coplanar. In some embodiments, the at least two non-coplanar faces are parallel. In some embodiments, the at least two non-coplanar faces are offset by an offset distance of about 0.01 inches to about 3 inches. In some embodiments, the at least two non-coplanar faces are offset by an offset distance of at least about 0.01 inches. In some embodiments, the at least two non-coplanar faces are offset by an offset distance of at most about 3 inches. In some embodiments, the at least two non-coplanar faces are offset by an offset distance of about 0.01 inches to about 0.02 inches, about 0.01 inches to about 0.05 inches, about 0.01 inches to about 0.1 inches, about 0.01 inches to about 0.2 inches, about 0.01 inches to about 0.5 inches, about 0.01 inches to about 1 inch, about 0.01 inches to about 2 inches, about 0.01 inches to about 3 inches, about 0.02 inches to about 0.05 inches, about 0.02 inches to about 0.1 inches, about 0.02 inches to about 0.2 inches, about 0.02 inches to about 0.5 inches, about 0.02 inches to about 1 inch, about 0.02 inches to about 2 inches, about 0.02 inches to about 3 inches, about 0.05 inches to about 0.1 inches, about 0.05 inches to about 0.2 inches, about 0.05 inches to about 0.5 inches, about 0.05 inches to about 1 inch, about 0.05 inches to about 2 inches, about 0.05 inches to about 3 inches, about 0.1 inches to about 0.2 inches, about 0.1 inches to about 0.5 inches, about 0.1 inches to about 1 inch, about 0.1 inches to about 2 inches, about 0.1 inches to about 3 inches, about 0.2 inches to about 0.5 inches, about 0.2 inches to about 1 inch, about 0.2 inches to about 2 inches, about 0.2 inches to about 3 inches, about 0.5 inches to about 1 inch, about 0.5 inches to about 2 inches, about 0.5 inches to about 3 inches, about 1 inch to about 2 inches, about 1 inch to about 3 inches, or about 2 inches to about 3 inches. In some embodiments, the at least two non-coplanar faces are offset by an offset distance of about 0.01 inches, about 0.02 inches, about 0.05 inches, about 0.1 inches, about 0.2 inches, about 0.5 inches, about 1 inch, about 2 inches, or about 3 inches.

In some embodiments, the encoded information is non-temporally encoded. In some embodiments, wherein the encoded information is navigational information. In some embodiments, the navigational information comprises a speed limit, a direction of travel, a location, or any combination thereof. In some embodiments, the encoded information is non-navigational information. In some embodiments, the navigational information comprises advertising information. In some embodiments, the lens is passive. In some embodiments, the lens is non-mechanical. In some embodiments, the lens is non-electronic. In some embodiments, the reflective marker is a road marker, a road sign, or a vehicle marker. In some embodiments, reflective marker is an aviation runway marker or an aircraft marker. In some embodiments, the reflective marker is a shipping lane marker, a ship marker, or a shipping container marker. In some embodiments, the reflective marker is a residential structure marker, a retail structure marker, a parking structure marker, or a warehouse marker. In some embodiments, the lens further comprises a region of a third type comprising a second filter embedded in the lens, the second filter attenuating a second light having a wavelength outside the visible spectrum and different than that of the first light incident on the face and reflecting light having a wavelength within the visible spectrum incident on the face to its source such that the second light incident on the face is reflected to its source as a second pattern, the second pattern comprising encoded information. In some embodiments, the second light has a wavelength in the near infrared wavelength spectrum. In some embodiments, the second light has a wavelength between 893 nm and 913 nm or between 1540 nm and 1560 nm. In some embodiments, second filter comprises an absorptive dye, a polarizing filter, an interference filter, a physical filter, or any combination thereof.

In some embodiments, the marker lens has a width, length, or depth of about 0.25 inches to about 50 inches. In some embodiments, the marker lens has a width, length, or depth of at least about 0.25 inches. In some embodiments, the marker lens has a width, length, or depth of at most about 50 inches. In various embodiments, the marker lens has a width, length, or depth of about 0.25 inches to about 0.5 inches, about 0.25 inches to about 0.75 inches, about 0.25 inches to about 1 inch, about 0.25 inches to about 2 inches, about 0.25 inches to about 5 inches, about 0.25 inches to about 10 inches, about 0.25 inches to about 15 inches, about 0.25 inches to about 20 inches, about 0.25 inches to about 30 inches, about 0.25 inches to about 40 inches, about 0.25 inches to about 50 inches, about 0.5 inches to about 0.75 inches, about 0.5 inches to about 1 inch, about 0.5 inches to about 2 inches, about 0.5 inches to about 5 inches, about 0.5 inches to about 10 inches, about 0.5 inches to about 15 inches, about 0.5 inches to about 20 inches, about 0.5 inches to about 30 inches, about 0.5 inches to about 40 inches, about 0.5 inches to about 50 inches, about 0.75 inches to about 1 inch, about 0.75 inches to about 2 inches, about 0.75 inches to about 5 inches, about 0.75 inches to about 10 inches, about 0.75 inches to about 15 inches, about 0.75 inches to about 20 inches, about 0.75 inches to about 30 inches, about 0.75 inches to about 40 inches, about 0.75 inches to about 50 inches, about 1 inch to about 2 inches, about 1 inch to about 5 inches, about 1 inch to about 10 inches, about 1 inch to about 15 inches, about 1 inch to about 20 inches, about 1 inch to about 30 inches, about 1 inch to about 40 inches, about 1 inch to about 50 inches, about 2 inches to about 5 inches, about 2 inches to about 10 inches, about 2 inches to about 15 inches, about 2 inches to about 20 inches, about 2 inches to about 30 inches, about 2 inches to about 40 inches, about 2 inches to about 50 inches, about 5 inches to about 10 inches, about 5 inches to about 15 inches, about 5 inches to about 20 inches, about 5 inches to about 30 inches, about 5 inches to about 40 inches, about 5 inches to about 50 inches, about 10 inches to about 15 inches, about 10 inches to about 20 inches, about 10 inches to about 30 inches, about 10 inches to about 40 inches, about 10 inches to about 50 inches, about 15 inches to about 20 inches, about 15 inches to about 30 inches, about 15 inches to about 40 inches, about 15 inches to about 50 inches, about 20 inches to about 30 inches, about 20 inches to about 40 inches, about 20 inches to about 50 inches, about 30 inches to about 40 inches, about 30 inches to about 50 inches, or about 40 inches to about 50 inches. In various particular embodiments, the marker lens has a width, length, or depth of about 0.25 inches, about 0.5 inches, about 0.75 inches, about 1 inch, about 2 inches, about 5 inches, about 10 inches, about 15 inches, about 20 inches, about 30 inches, about 40 inches, or about 50 inches, including increments therein.

A fourth aspect provided herein is a system comprising: a LiDAR apparatus configured to transmit at least a first laser into an environment, the first laser having a wavelength outside the visible wavelength spectrum; a reflective marker positioned in the environment; at least one marker lens fastened to the reflective marker; wherein the marker lens comprises: a plurality of regions, the plurality of regions comprising at least a region of a first type and a region of a second type; the region of the first type comprising a first filter associated with the lens, the first filter attenuating the first laser incident on the face; the region of the second type lacking the first filter and reflecting the first laser incident on the face to the LiDAR; wherein both the region of the first type and the region of the second type reflect light within the visible wavelength spectrum incident on the face to its source; and wherein the first laser incident on the face is reflected to the LiDAR as a first pattern, the first pattern comprising encoded information; a receiver positioned within the LiDAR and configured to receive the reflected first laser and the first pattern; and a computer comprising at least one processor configured to decode the encoded information.

In some embodiments, the marker lens further comprises a fastener capable of fastening the lens to a reflective marker. In some embodiments, the fastener comprises a screw, a nut, a nail, a threaded hole, an unthreaded hole, an adhesive, an epoxy, a crimp, a rivet, a tie, or any combination thereof. In some embodiments, the lens comprises 2, 3, 4, 5, 6, 7, 8, 9, 10, or more regions of the first type. In some embodiments, the lens comprises least 2, 3, 4, 5, 6, 7, 8, 9, or 10 regions of the second type. In some embodiments, the face is substantially planar. In some embodiments, the lens comprises 2, 3, 4, or 5 faces. In some embodiments, each face is substantially planar. In some embodiments, the first light has a wavelength in the near infrared wavelength spectrum. In some embodiments, the first light has a wavelength between 893 nm and 913 nm. In some embodiments, the first light has a wavelength between 1540 nm and 1560 nm. In some embodiments, the first filter comprises an absorptive dye, a polarizing filter, an interference filter, a physical filter, or any combination thereof. In some embodiments, the first filter consists of an absorptive dye. In some embodiments, the lens is polycarbonate. In some embodiments, the lens is glass.

In some embodiments, the encoded information in the first pattern is spatially encoded. In some embodiments, the spatial encoding comprises a one-dimensional encoding, a two-dimensional encoding, a three-dimensional encoding, or any combination thereof. In some embodiments, the spatial encoding comprises a three-dimensional encoding, wherein the marker device comprises a plurality of faces, and wherein a distance between at least two of the plurality of faces encodes information. In some embodiments, the spatial encoding comprises a QR code, a bar code, a pattern, an array, a two-dimensional shape, a three-dimensional shape, a number, a letter, a symbol, or any combination thereof. In some embodiments, the reflective marker device of comprises a plurality of faces, wherein at least two of the plurality of faces are non-coplanar. In some embodiments, the at least two non-coplanar faces are parallel. In some embodiments, the at least two non-coplanar faces are offset by an offset distance of about 0.01 inches to about 3 inches. In some embodiments, the at least two non-coplanar faces are offset by an offset distance of at least about 0.01 inches. In some embodiments, the at least two non-coplanar faces are offset by an offset distance of at most about 3 inches. In some embodiments, the at least two non-coplanar faces are offset by an offset distance of about 0.01 inches to about 0.02 inches, about 0.01 inches to about 0.05 inches, about 0.01 inches to about 0.1 inches, about 0.01 inches to about 0.2 inches, about 0.01 inches to about 0.5 inches, about 0.01 inches to about 1 inch, about 0.01 inches to about 2 inches, about 0.01 inches to about 3 inches, about 0.02 inches to about 0.05 inches, about 0.02 inches to about 0.1 inches, about 0.02 inches to about 0.2 inches, about 0.02 inches to about 0.5 inches, about 0.02 inches to about 1 inch, about 0.02 inches to about 2 inches, about 0.02 inches to about 3 inches, about 0.05 inches to about 0.1 inches, about 0.05 inches to about 0.2 inches, about 0.05 inches to about 0.5 inches, about 0.05 inches to about 1 inch, about 0.05 inches to about 2 inches, about 0.05 inches to about 3 inches, about 0.1 inches to about 0.2 inches, about 0.1 inches to about 0.5 inches, about 0.1 inches to about 1 inch, about 0.1 inches to about 2 inches, about 0.1 inches to about 3 inches, about 0.2 inches to about 0.5 inches, about 0.2 inches to about 1 inch, about 0.2 inches to about 2 inches, about 0.2 inches to about 3 inches, about 0.5 inches to about 1 inch, about 0.5 inches to about 2 inches, about 0.5 inches to about 3 inches, about 1 inch to about 2 inches, about 1 inch to about 3 inches, or about 2 inches to about 3 inches. In some embodiments, the at least two non-coplanar faces are offset by an offset distance of about 0.01 inches, about 0.02 inches, about 0.05 inches, about 0.1 inches, about 0.2 inches, about 0.5 inches, about 1 inch, about 2 inches, or about 3 inches.

In some embodiments, the encoded information is non-temporally encoded. In some embodiments, wherein the encoded information is navigational information. In some embodiments, the navigational information comprises a speed limit, a direction of travel, a location, or any combination thereof. In some embodiments, the encoded information is non-navigational information. In some embodiments, the navigational information comprises advertising information. In some embodiments, the lens is passive. In some embodiments, the lens is non-mechanical. In some embodiments, the lens is non-electronic. In some embodiments, the reflective marker is a road marker, a road sign, or a vehicle marker. In some embodiments, reflective marker is an aviation runway marker or an aircraft marker. In some embodiments, the reflective marker is a shipping lane marker, a ship marker, or a shipping container marker. In some embodiments, the reflective marker is a residential structure marker, a retail structure marker, a parking structure marker, or a warehouse marker. In some embodiments, the lens further comprises a region of a third type comprising a second filter embedded in the lens, the second filter attenuating a second light having a wavelength outside the visible spectrum and different than that of the first light incident on the face and reflecting light having a wavelength within the visible spectrum incident on the face to its source such that the second light incident on the face is reflected to its source as a second pattern, the second pattern comprising encoded information. In some embodiments, the second light has a wavelength in the near infrared wavelength spectrum. In some embodiments, the second light has a wavelength between 893 nm and 913 nm or between 1540 nm and 1560 nm. In some embodiments, second filter comprises an absorptive dye, a polarizing filter, an interference filter, a physical filter, or any combination thereof.

A fifth aspect provide herein is a kit for retrofitting existing reflective markers, wherein the kit comprises a marker lens comprising a plurality of regions, the plurality of regions comprising at least a region of a first type and a region of a second type; the region of the first type comprising a first filter embedded in the lens, the first filter attenuating a first light outside the visible wavelength spectrum incident on the face; the region of the second type lacking the first filter and reflecting the first light incident on the face to its source; wherein both the region of the first type and the region of the second type reflect light within the visible wavelength spectrum incident on the face to its source; and wherein the first light incident on the face is reflected to its source as a first pattern, the first pattern comprising encoded information; and a fastener adapted to attach the marker lens to the existing reflective marker.

In some embodiments, the marker lens comprises 2, 3, 4, 5, 6, 7, 8, 9, 10, or more regions of the first type. In some embodiments, the marker lens comprises 2, 3, 4, 5, 6, 7, 8, 9, 10, or more regions of the second type. In some embodiments, the first light has a wavelength in the near infrared wavelength spectrum. In some embodiments, the first light has a wavelength between 893 nm and 913 nm. In some embodiments, the first light has a wavelength between 1540 nm and 1560 nm. In some embodiments, the first filter comprises an absorptive dye, a polarizing filter, an interference filter, a physical filter, or any combination thereof. In some embodiments, the first filter consists of an absorptive dye. In some embodiments, the marker lens comprises polycarbonate, glass, plastic, or any combination thereof.

In some embodiments, the encoded information in the first pattern is spatially encoded. In some embodiments, the spatial encoding comprises a one-dimensional encoding, a two-dimensional encoding, a three-dimensional encoding, or any combination thereof. In some embodiments, the spatial encoding comprises a three-dimensional encoding, wherein the marker device comprises a plurality of faces, and wherein a distance between at least two of the plurality of faces encodes information. In some embodiments, the spatial encoding comprises a QR code, a bar code, a pattern, an array, a two-dimensional shape, a three-dimensional shape, a number, a letter, a symbol, or any combination thereof. In some embodiments, the reflective marker device of comprises a plurality of faces, wherein at least two of the plurality of faces are non-coplanar. In some embodiments, the at least two non-coplanar faces are parallel. In some embodiments, the at least two non-coplanar faces are offset by an offset distance of about 0.01 inches to about 3 inches. In some embodiments, the at least two non-coplanar faces are offset by an offset distance of at least about 0.01 inches. In some embodiments, the at least two non-coplanar faces are offset by an offset distance of at most about 3 inches. In some embodiments, the at least two non-coplanar faces are offset by an offset distance of about 0.01 inches to about 0.02 inches, about 0.01 inches to about 0.05 inches, about 0.01 inches to about 0.1 inches, about 0.01 inches to about 0.2 inches, about 0.01 inches to about 0.5 inches, about 0.01 inches to about 1 inch, about 0.01 inches to about 2 inches, about 0.01 inches to about 3 inches, about 0.02 inches to about 0.05 inches, about 0.02 inches to about 0.1 inches, about 0.02 inches to about 0.2 inches, about 0.02 inches to about 0.5 inches, about 0.02 inches to about 1 inch, about 0.02 inches to about 2 inches, about 0.02 inches to about 3 inches, about 0.05 inches to about 0.1 inches, about 0.05 inches to about 0.2 inches, about 0.05 inches to about 0.5 inches, about 0.05 inches to about 1 inch, about 0.05 inches to about 2 inches, about 0.05 inches to about 3 inches, about 0.1 inches to about 0.2 inches, about 0.1 inches to about 0.5 inches, about 0.1 inches to about 1 inch, about 0.1 inches to about 2 inches, about 0.1 inches to about 3 inches, about 0.2 inches to about 0.5 inches, about 0.2 inches to about 1 inch, about 0.2 inches to about 2 inches, about 0.2 inches to about 3 inches, about 0.5 inches to about 1 inch, about 0.5 inches to about 2 inches, about 0.5 inches to about 3 inches, about 1 inch to about 2 inches, about 1 inch to about 3 inches, or about 2 inches to about 3 inches. In some embodiments, the at least two non-coplanar faces are offset by an offset distance of about 0.01 inches, about 0.02 inches, about 0.05 inches, about 0.1 inches, about 0.2 inches, about 0.5 inches, about 1 inch, about 2 inches, or about 3 inches.

In some embodiments, the encoded information is non-temporally encoded. In some embodiments, the encoded information is navigational information. In some embodiments, wherein the navigational information comprises a speed limit, a direction of travel, a location, or any combination thereof. In some embodiments, the encoded information is non-navigational information. In some embodiments, the non-navigational information comprises advertising information. In some embodiments, the marker lens is passive. In some embodiments, the marker lens is non-mechanical. In some embodiments, the marker lens is non-electronic.

In some embodiments, the existing reflective marker is a road marker, a road sign, or a vehicle marker. In some embodiments, the existing reflective marker is an aviation runway marker or an aircraft marker. In some embodiments, the existing reflective marker is a shipping lane marker, a ship marker, or a shipping container marker. In some embodiments, the existing reflective marker is a residential structure marker, a retail structure marker, a parking structure marker, or a warehouse marker.

In some embodiments, the marker lens further comprises a region of a third type comprising a second filter embedded in the lens, the second filter attenuating a second light having a wavelength outside the visible spectrum and different than that of the first light incident on the face and reflecting light having a wavelength within the visible spectrum incident on the face to its source such that the second light incident on the face is reflected to its source as a second pattern, the second pattern comprising encoded information. In some embodiments, the second light has a wavelength in the near infrared wavelength spectrum. In some embodiments, second light has a wavelength between 893 nm and 913 nm or between 1540 nm and 1560 nm. In some embodiments, the second filter comprises an absorptive dye, a polarizing filter, an interference filter, a physical filter, or any combination thereof.

In some embodiments, the fastener comprises a screw, a nut, a nail, a threaded hole, an unthreaded hole, an adhesive, an epoxy, a cement, a crimp, a rivet, a tie, or any combination thereof. In some embodiments, the fastener consists of an adhesive. In some embodiments, the fastener consists of a transparent adhesive. In some embodiments, the adhesive comprises a bottle, a tape, a patch, or a spray. In some embodiments, the adhesive comprises a light activated adhesive, an air activated adhesive, a pressure activated adhesive, or a temperature activated adhesive. In some embodiments, the adhesive comprises one or more parts. In some embodiments, the kit further comprises a container. In some embodiments, the container comprises a plurality of segments. In some embodiments, the number of segments is about 2 to about 200. In some embodiments, the number of marker lenses in each container is about 2 to about 10,000. In some embodiments, the number of fasteners in each container is about 2 to about 10,000. In some embodiments, the kit comprises two or more types of marker lenses. In some embodiments, each of the two or more types of marker lenses differ by at least one of a shape, a size, a visual color, and the encoded information. In some embodiments, the marker lens further comprises a visual indicator on a face of the marker, wherein the visual indicator corresponds to at least one the encoded information and the type.

In some embodiments, the kit further comprises a label for each of the two or more types of marker lenses. In some embodiments, the kit further comprises at least one of an instruction sheet, a cleaning solution, a cleaning tool, a jig, a measuring element, a protective cover, a trash bag, a protective bag, a brush, a syringe, a stirrer, and an applicator. In some embodiments, a quantity of at least one of the instruction sheet, the cleaning solution, the cleaning tool, the jig, the measuring element, the protective cover, the trash bag, the protective bag, the brush, the syringe, the stirrer, and the applicator in the kit is about 1 to 10,000. In some embodiments, the marker lens is individually wrapped. In some embodiments, the marker lens comprises a pad of temporarily adjoined marker lenses. In some embodiments, the marker lens comprises a roll of marker lenses. In some embodiments, the roll of marker lenses comprises a continuous array of marker lenses separated by at least one of a perforation and a demarcation. In some embodiments, the roll of marker lenses comprises a protective liner positioned above or below each layer of marker lenses within the roll of marker lenses. In some embodiments, the roll of marker lenses comprises a tube positioned within the roll of marker lenses, wherein the roll of marker lenses is wrapped around the tube. In some embodiments, the roll of marker lenses comprises an unrolling prevention fastener. In some embodiments, the kit further comprises a bag enveloping the roll of marker lenses. In some embodiments, the kit further comprises an unrolling rod.

A sixth aspect provided herein is a method of applying a marker lens to an existing reflective marker comprising: preparing a surface the existing reflective marker; and adhering the marker lens to the existing reflective marker with an adhesive; wherein the marker lens comprises a face comprising a plurality of regions, the plurality of regions comprising at least a region of a first type and a region of a second type; the region of the first type comprising a first filter embedded in the lens, the first filter attenuating a first light outside the visible wavelength spectrum incident on the face; the region of the second type lacking the first filter and reflecting the first light incident on the face to its source; wherein both the region of the first type and the region of the second type reflect light within the visible wavelength spectrum incident on the face to its source; and wherein the first light incident on the face is reflected to its source as a first pattern, the first pattern comprising encoded information.

In some embodiments, the marker lens comprises 2, 3, 4, 5, 6, 7, 8, 9, 10, or more regions of the first type. In some embodiments, the marker lens comprises 2, 3, 4, 5, 6, 7, 8, 9, 10, or more regions of the second type. In some embodiments, the first light has a wavelength in the near infrared wavelength spectrum. In some embodiments, the first light has a wavelength between 893 nm and 913 nm. In some embodiments, the first light has a wavelength between 1540 nm and 1560 nm. In some embodiments, the first filter comprises an absorptive dye, a polarizing filter, an interference filter, a physical filter, or any combination thereof. In some embodiments, the first filter consists of an absorptive dye. In some embodiments, the marker lens comprises polycarbonate, glass, plastic, or any combination thereof.

In some embodiments, the encoded information in the first pattern is spatially encoded. In some embodiments, the spatial encoding comprises a one-dimensional encoding, a two-dimensional encoding, a three-dimensional encoding, or any combination thereof. In some embodiments, the spatial encoding comprises a three-dimensional encoding, wherein the marker device comprises a plurality of faces, and wherein a distance between at least two of the plurality of faces encodes information. In some embodiments, the spatial encoding comprises a QR code, a bar code, a pattern, an array, a two-dimensional shape, a three-dimensional shape, a number, a letter, a symbol, or any combination thereof. In some embodiments, the reflective marker device of comprises a plurality of faces, wherein at least two of the plurality of faces are non-coplanar. In some embodiments, the at least two non-coplanar faces are parallel. In some embodiments, the at least two non-coplanar faces are offset by an offset distance of about 0.01 inches to about 3 inches. In some embodiments, the at least two non-coplanar faces are offset by an offset distance of at least about 0.01 inches. In some embodiments, the at least two non-coplanar faces are offset by an offset distance of at most about 3 inches. In some embodiments, the at least two non-coplanar faces are offset by an offset distance of about 0.01 inches to about 0.02 inches, about 0.01 inches to about 0.05 inches, about 0.01 inches to about 0.1 inches, about 0.01 inches to about 0.2 inches, about 0.01 inches to about 0.5 inches, about 0.01 inches to about 1 inch, about 0.01 inches to about 2 inches, about 0.01 inches to about 3 inches, about 0.02 inches to about 0.05 inches, about 0.02 inches to about 0.1 inches, about 0.02 inches to about 0.2 inches, about 0.02 inches to about 0.5 inches, about 0.02 inches to about 1 inch, about 0.02 inches to about 2 inches, about 0.02 inches to about 3 inches, about 0.05 inches to about 0.1 inches, about 0.05 inches to about 0.2 inches, about 0.05 inches to about 0.5 inches, about 0.05 inches to about 1 inch, about 0.05 inches to about 2 inches, about 0.05 inches to about 3 inches, about 0.1 inches to about 0.2 inches, about 0.1 inches to about 0.5 inches, about 0.1 inches to about 1 inch, about 0.1 inches to about 2 inches, about 0.1 inches to about 3 inches, about 0.2 inches to about 0.5 inches, about 0.2 inches to about 1 inch, about 0.2 inches to about 2 inches, about 0.2 inches to about 3 inches, about 0.5 inches to about 1 inch, about 0.5 inches to about 2 inches, about 0.5 inches to about 3 inches, about 1 inch to about 2 inches, about 1 inch to about 3 inches, or about 2 inches to about 3 inches. In some embodiments, the at least two non-coplanar faces are offset by an offset distance of about 0.01 inches, about 0.02 inches, about 0.05 inches, about 0.1 inches, about 0.2 inches, about 0.5 inches, about 1 inch, about 2 inches, or about 3 inches.

In some embodiments, the encoded information is non-temporally encoded. In some embodiments, the encoded information is navigational information. In some embodiments, the navigational information comprises a speed limit, a direction of travel, a location, or any combination thereof. In some embodiments, the encoded information is non-navigational information. In some embodiments, the non-navigational information comprises advertising information. In some embodiments, the marker lens is passive. In some embodiments, the marker lens is non-mechanical. In some embodiments, the marker lens is non-electronic.

In some embodiments, the existing reflective marker is a road marker, a road sign, or a vehicle marker. In some embodiments, the existing reflective marker is an aviation runway marker or an aircraft marker. In some embodiments, the existing reflective marker is a shipping lane marker, a ship marker, or a shipping container marker. In some embodiments, the existing reflective marker is a residential structure marker, a retail structure marker, a parking structure marker, or a warehouse marker. In some embodiments, the marker lens further comprises a region of a third type comprising a second filter embedded in the lens, the second filter attenuating a second light having a wavelength outside the visible spectrum and different than that of the first light incident on the face and reflecting light having a wavelength within the visible spectrum incident on the face to its source such that the second light incident on the face is reflected to its source as a second pattern, the second pattern comprising encoded information. In some embodiments, the second light has a wavelength in the near infrared wavelength spectrum. In some embodiments, the second light has a wavelength between 893 nm and 913 nm or between 1540 nm and 1560 nm. In some embodiments, the second filter comprises an absorptive dye, a polarizing filter, an interference filter, a physical filter, or any combination thereof. In some embodiments, the marker lens further comprises a visual indicator on the face, wherein the visual indicator corresponds to at least one of the encoded information and the type. In some embodiments, the marker lens comprises two or more types of marker lenses.

In some embodiments, the method further comprises at least one of determining and confirming the type of marker lens to apply to the existing reflective marker. In some embodiments, the adhesive consists of a transparent adhesive. In some embodiments, the adhesive comprises a bottle, a tape, or a spray. In some embodiments, the adhesive comprises a light activated adhesive, an air activated adhesive, a pressure activated adhesive, or a temperature activated adhesive. In some embodiments, the adhesive comprises one or more parts. In some embodiments, the adhesive comprises a pre-applied adhesive on a surface of the marker lens. In some embodiments, preparing the surface of the existing reflective marker comprises removing a protective cover from a marker lens with an adhesive backing. In some embodiments, the method further comprises applying the adhesive to at least one of a surface of the marker lens and a surface of the existing reflective marker. In some embodiments, preparing the surface of the existing reflective marker comprises cleaning comprises cleaning the surface of the existing reflective marker with at least one of a cleaning solution and a cleaning tool. In some embodiments, applying the adhesive to at least one of a surface of the marker lens and a surface of the existing reflective marker comprises applying the adhesive with at least one of a brush, a syringe, a stirrer, and an applicator. In some embodiments, each of the two or more types of marker lenses differ by at least one of a shape, a size, a visual color, or the encoded information. In some embodiments, adhering the marker lens to the existing reflective marker comprises using at least one of a jig and a measuring element to position the marker lens on the existing reflective marker. In some embodiments, the method further comprises at least one of unwrapping the marker lens, unrolling the marker lens, separating a marker lens from a stack or sheet of marker lenses, and removing a protective cover from the marker lens.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 3 shows a non-limiting illustration of a visible light and laser light reflecting off a first region and a second region of a reflective surface;

FIG. 4 shows a non-limiting illustration of a visible light and laser light reflecting off a first region and a second region of a retroreflective surface;

DETAILED DESCRIPTION OF THE INVENTION

Retroreflective Surfaces

A retroreflective surface, also known as a retroreflector or cataphote, is a device or surface that reflects light back along a vector that is parallel to but opposite in direction from the light's source, with a minimum amount of scattering. The angle of incidence at which a retroreflected device or surface reflects light in this way is greater than zero, unlike a planar mirror.

Figure 1:
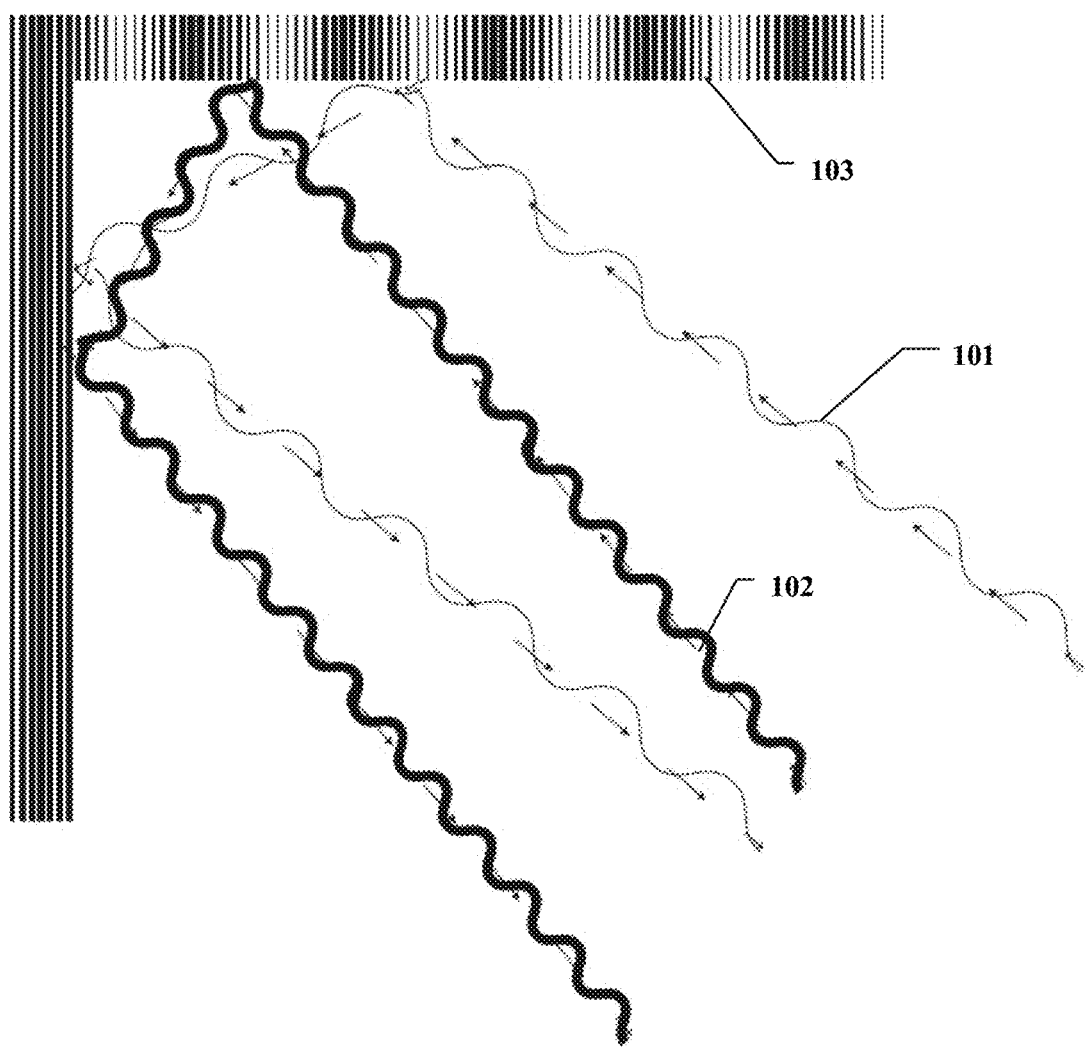
FIG. 1 shows a non-limiting illustration of a top view of a retroreflective corner surface of a retroreflective device.

One type of retroreflector is a corner reflector, which comprises a set of two mutually perpendicular reflective surfaces which work as a retroreflector. FIG. 1 shows a non-limiting illustration of a top view of a retroreflective corner surface 103, wherein both a visible light beam 101 and a laser beam 102 are reflected by the two perpendicular reflective surfaces at an angles perpendicular and opposite to the direction at which they entered.

Another type of retroreflector, known as a "Cat's Eye" consists of refracting optical elements with a reflective surface, arranged so that the focal surface of the refractive element coincides with the reflective surface.

In some embodiments, retroreflective surfaces are used to redirect light emitted from the headlamps or lights of a vehicle, directly back to the vehicle to provide a visual indicator without powered illumination. In some embodiments, the ability of a retroreflective surface to provide a visual indicator without powered illumination allows for such surfaces to serve as passive markers that require less maintenance, are more durable and economic, and can function during power outages.

Reflective Marker Devices

Figure 2:
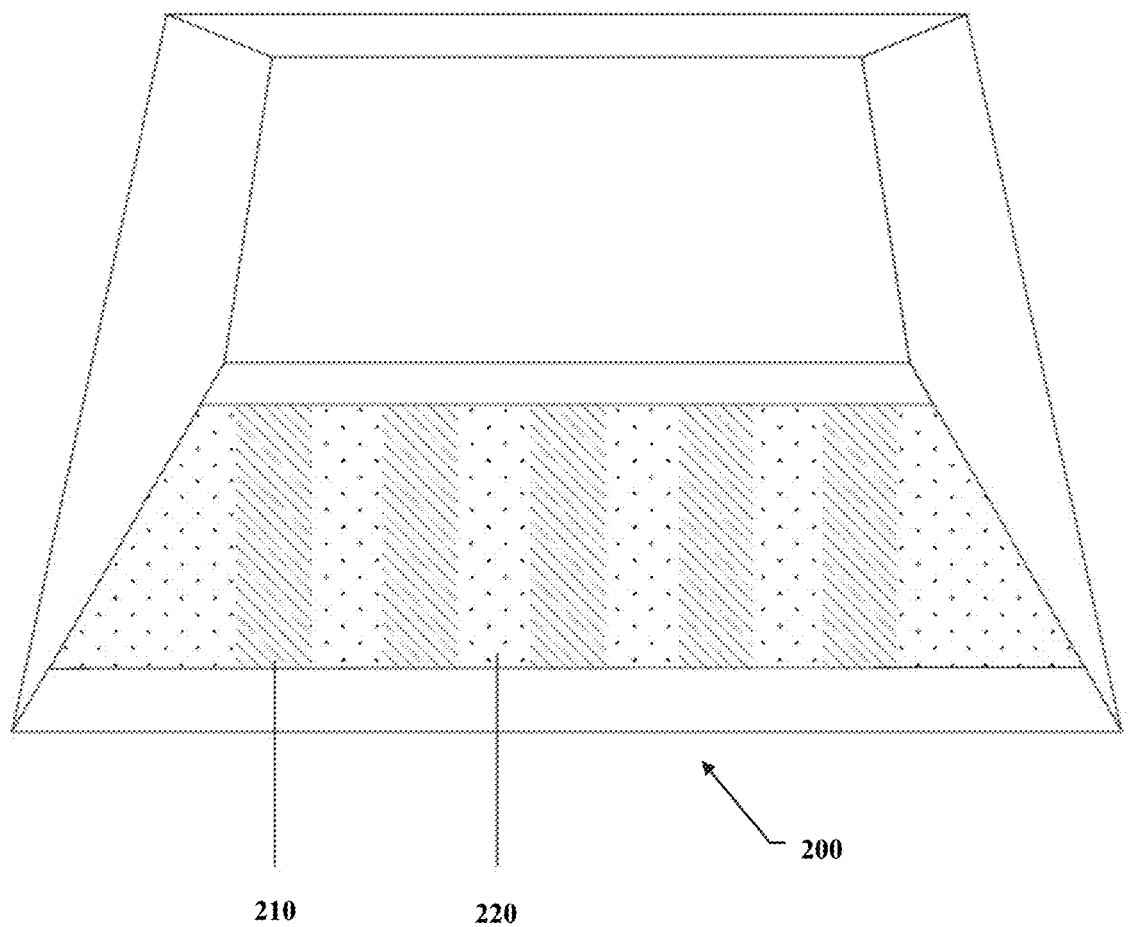
FIG. 2 shows a non-limiting illustration of an exemplary reflective marker device comprising a first region and second region.

A non-limiting illustration of a first exemplary reflective marker device 200 is shown in FIG. 2, comprising a retroreflective surface and a lens covering the retroreflective surface to form a face comprising a plurality of regions, the plurality of regions comprising at least a region of a first type 210 and a region of a second type 220.

Figure 6:
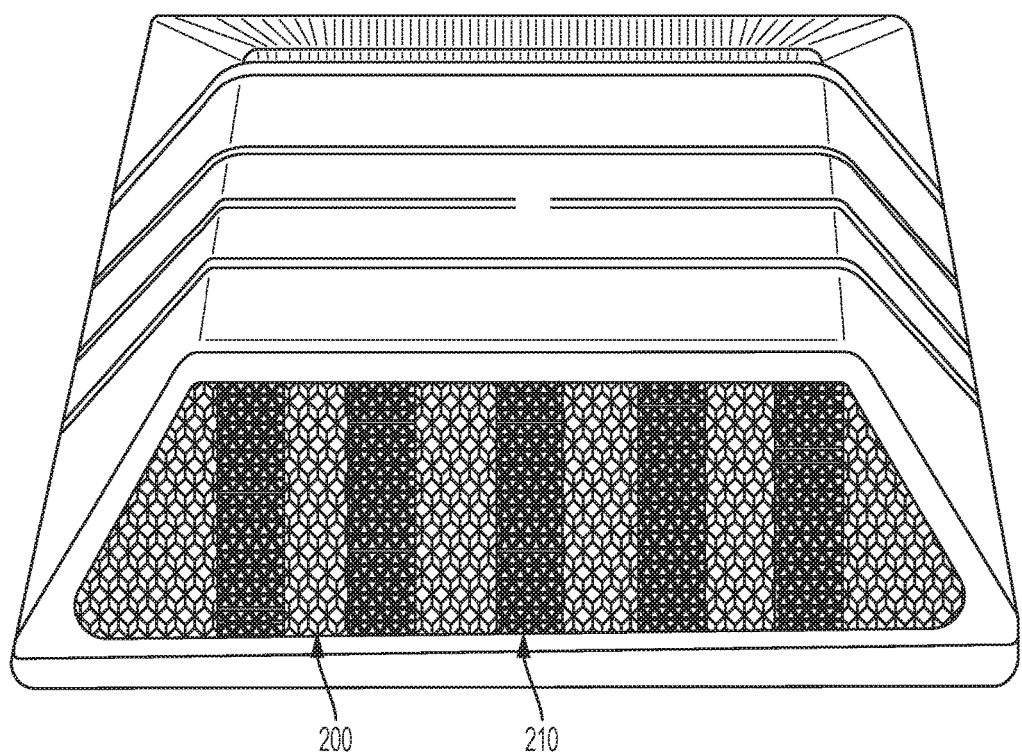
FIG. 6 shows a non-limiting image of an exemplary reflective marker device, as described herein.

In some embodiments, per FIG. 4, the region of the first type 210 comprises a first filter embedded in the lens 450, the first filter attenuating a first laser outside the visible wavelength spectrum incident on the face. In some embodiments, the region of the second type 220 lacks the first filter and reflects the first laser incident on the face to its source. In some embodiments, both the region of the first type 210 and the region of the second type 220 reflect light within the visible wavelength spectrum incident on the face to its source, wherein the first laser incident on the face is reflected to its source as a first pattern, the first pattern comprising encoded information. A non-limiting illustration of an exemplary reflective marker device, as described herein, is shown in FIG. 6.

FIG. 3 shows a non-limiting illustration of a visible light and laser light reflecting off a first region 210, which comprises a first filter that attenuates light outside the visible spectrum, and a second region 220, of a reflective surface 330 lacking the first filter. As shown, both a visible light beam 101, and a laser light beam 102 entering the second region 220 are reflected by the reflective surface 230 with non-attenuated strengths. Further the visible light beam 101 and a laser light beam 102 entering the first region 210 are reflected by the reflective surface 230 with slightly attenuated and fully-attenuated strengths, respectively. In both the first region 210 and the second region 220, the angle of incidence with the reflective surface 330 is equal to the angle of refraction.

FIG. 4 shows a non-limiting illustration of a visible light and laser light reflecting off a first region 210, which comprises a first filter that attenuates light outside the visible spectrum, and a second region 220, lacking the first filter, of a retroreflected surface 440. As shown, both a visible light beam 101, and a laser light beam 102 entering the second region 220 are reflected by the reflective surface 230 with non-attenuated strengths. Further the visible light beam 101 and a laser light beam 102 entering the first region 210 are reflected by the reflective surface 230 with slightly attenuated and fully-attenuated strengths, respectively. In both the first region 210 and the second region 220, the vector of the incoming visible light 101 and a laser light 102 beams are parallel and opposite to each other.

Figure 5A:
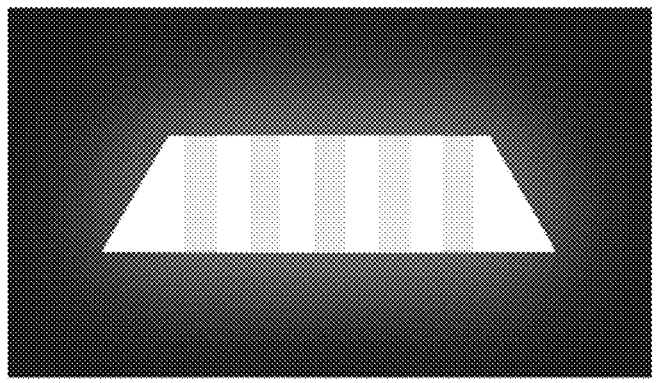
FIG. 5A shows a non-limiting illustration of an exemplary reflective marker device as visible by a human eye.
Figure 5B:
FIG. 5B shows a non-limiting illustration of an exemplary reflective marker device as visible by a Light Detection and Ranging (LiDAR)

FIG. 5A shows a non-limiting illustration of an exemplary reflective marker device as visible by a human eye, wherein visible light reflected off the first region has a slightly attenuated strength, and wherein the visible light reflected off the second region is less attenuated in strength than light reflected off the first region. FIG. 5B shows a non-limiting illustration of an exemplary reflective marker device as visible by Light Detection and Ranging (LiDAR) wherein laser light reflected off the first region is fully attenuated in strength, and wherein the laser light reflected off the second region is less attenuated in strength.

In some embodiments, the difference in the attenuation strengths a laser light reflected off the first region 210 and the second region 220 can be detected by mechanical vision, such as, for example, a LiDAR, to convey digital or analog information to a computer or processor connected to the LiDAR.

Reflective Marker Retrofit Kit

Figure 9:
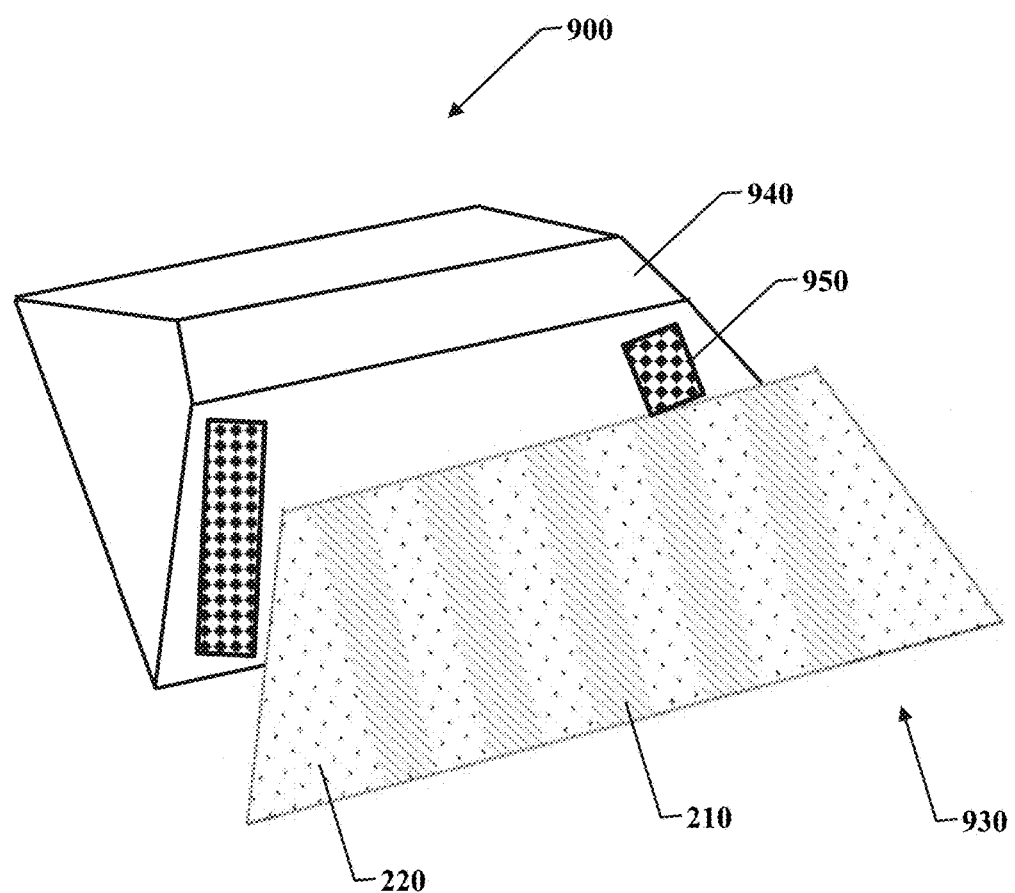
FIG. 9 shows a non-limiting illustration of a perspective view of an exemplary reflective marker kit comprising an existing reflective marker and a lens.

A non-limiting illustration of a kit 900 for retrofitting an existing reflective marker 940 is shown in FIG. 9, comprising a marker lens 930 comprising a plurality of regions, the plurality of regions comprising at least a region of a first type 210 and a region of a second type 220; the region of the first type 210 comprising a first filter embedded in the lens, the first filter attenuating a first light outside the visible wavelength spectrum incident on the face; the region of the second type 220 lacking the first filter and reflecting the first light incident on the face to its source; wherein both the region of the first type 210 and the region of the second type 220 reflect light within the visible wavelength spectrum incident on the face to its source; and wherein the first light incident on the face is reflected to its source as a first pattern, the first pattern comprising encoded information; and a fastener 950 adapted to attach the marker lens 930 to the existing reflective marker 940.

In some embodiments, the marker lens 930 comprises 2, 3, 4, 5, 6, 7, 8, 9, 10, or more regions of the first type 210. In some embodiments, the marker lens 930 comprises 2, 3, 4, 5, 6, 7, 8, 9, 10, or more regions of the second type 220. In some embodiments, the first light has a wavelength in the near infrared wavelength spectrum. In some embodiments, the first light has a wavelength between 893 nm and 913 nm. In some embodiments, the first light has a wavelength between 1540 nm and 1560 nm. In some embodiments, the first filter comprises an absorptive dye, a polarizing filter, an interference filter, a physical filter, or any combination thereof. In some embodiments, the first filter consists of an absorptive dye. In some embodiments, the marker lens 930 comprises polycarbonate, glass, plastic, or any combination thereof. One of ordinary skill in the art would easily recognize that the marker lens 930 may be formed of any transparent or semi-transparent material that is sufficiently rigid and durable to be applied to, and used on existing reflective markers 940. In some embodiments, the marker lens further comprises a second retroreflective surface. In some embodiments, the second retroreflective surface is separated by a distance from the an existing reflective marker 940.

In some embodiments, the encoded information in the first pattern is spatially encoded. In some embodiments, the spatial encoding is a two-dimensional pattern. In some embodiments, the two-dimensional pattern comprises a QR code, a bar code, a number, a letter, a symbol, or any combination thereof. In some embodiments, the encoded information is non-temporally encoded. In some embodiments, the encoded information is navigational information. In some embodiments, wherein the navigational information comprises a speed limit, a direction of travel, a location, or any combination thereof. In some embodiments, the encoded information is non-navigational information. In some embodiments, the non-navigational information comprises advertising information. In some embodiments, the marker lens 930 is passive. In some embodiments, the marker lens 930 is non-mechanical and non-electronic.

In some embodiments, the existing reflective marker 940 is a road marker, a road sign, or a vehicle marker. In some embodiments, the existing reflective marker 940 is an aviation runway marker or an aircraft marker. In some embodiments, the existing reflective marker 940 is a shipping lane marker, a ship marker, or a shipping container marker. In some embodiments, the existing reflective marker 940 is a residential structure marker, a retail structure marker, a parking structure marker, or a warehouse marker.

In some embodiments, the marker lens 930 further comprises a region of a third type comprising a second filter embedded in the marker lens 930, the second filter attenuating a second light having a wavelength outside the visible spectrum and different than that of the first light incident on the face and reflecting light having a wavelength within the visible spectrum incident on the face to its source such that the second light incident on the face is reflected to its source as a second pattern, the second pattern comprising encoded information. In some embodiments, the second light has a wavelength in the near infrared wavelength spectrum. In some embodiments, second light has a wavelength between 893 nm and 913 nm or between 1540 nm and 1560 nm. In some embodiments, the second filter comprises an absorptive dye, a polarizing filter, an interference filter, a physical filter, or any combination thereof.

In some embodiments, the fastener 950 comprises a screw, a nut, a nail, a threaded hole, an unthreaded hole, an adhesive, an epoxy, a cement, a crimp, a rivet, a tie, or any combination thereof. In some embodiments, the fastener consists of an adhesive. In some embodiments, the fastener 950 consists of a transparent adhesive. In some embodiments, the adhesive comprises a bottle, a tape, a patch, or a spray. In some embodiments, the adhesive comprises a light activated adhesive, an air activated adhesive, a pressure activated adhesive, or a temperature activated adhesive. In some embodiments, the adhesive comprises one or more parts.

In some embodiments, the kit further comprises a container. In some embodiments, the container comprises a plurality of segments. In some embodiments, the number of segments is about 2 to about 200. In some embodiments, the number of marker lenses 930 in each container is about 2 to about 10,000. In some embodiments, the number of fasteners 950 in each container is about 2 to about 10,000. In some embodiments, the kit comprises two or more types of marker lenses 930. In some embodiments, each of the two or more types of marker lenses 930 differ by at least one of a shape, a size, a visual color, and the encoded information. In some embodiments, the marker lens 950 further comprises a visual indicator on its face, wherein the visual indicator corresponds to at least one the encoded information and the type of the marker lens.

In some embodiments, the kit 900 further comprises a label for each of the two or more types of marker lenses. In some embodiments, the kit 900 further comprises at least one of an instruction sheet, a cleaning solution, a cleaning tool, a jig, a measuring element, a protective cover, a trash bag, a protective bag, a brush, a syringe, a stirrer, and an applicator. In some embodiments, a quantity of at least one of the instruction sheet, the cleaning solution, the cleaning tool, the jig, the measuring element, the protective cover, the trash bag, the protective bag, the brush, the syringe, the stirrer, and the applicator in the kit is about 1 to 10,000. In some embodiments, the marker lens 930 is individually wrapped. In some embodiments, the marker lens comprises a pad of temporarily adjoined marker lenses. In some embodiments, the marker lens 930 comprises a roll of marker lenses 930. In some embodiments, the roll of marker lenses 930 comprises a continuous array of marker lenses 930, each separated by at least one of a perforation and a demarcation. In some embodiments, the roll of marker lenses 930 comprises a protective liner positioned above or below each layer of marker lenses 930 within the roll of marker lenses 930. In some embodiments, the roll of marker lenses 930 comprises a tube positioned within the roll of marker lenses 930, wherein the roll of marker lenses 930 is wrapped around the tube. In some embodiments, the roll of marker lenses 930 comprises an unrolling prevention fastener. In some embodiments, the kit 900 further comprises a bag enveloping the roll of marker lenses 930. In some embodiments, the kit 900 further comprises an unrolling rod. In some embodiments the unrolling prevention faster comprises a band, a tape, a staple, a clip, or any combination thereof. In some embodiments the unrolling prevention faster ensures that the roll of marker lenses 930 remains intact within the kit 900.

In some embodiments, the kit 900 for retrofitting an existing reflective marker 940 can be employed to upgrade an existing reflective marker 940 to additionally encode light outside the visible wavelength spectrum. In some embodiments, the kit 900 for retrofitting an existing reflective marker 940 allows for easy, fast, and accurate application of the marker lens 930 to the existing reflective marker 940, wherein the adhesion between the marker lens 930 and the existing reflective marker 940 is durable and long-lasting.

Methods for Applying a Marker Device

Provided herein is a method of applying a marker lens to an existing reflective marker comprising: preparing a surface the existing reflective marker; and adhering the marker lens to the existing reflective marker with an adhesive; wherein the marker lens comprises a face comprising a plurality of regions, the plurality of regions comprising at least a region of a first type and a region of a second type; the region of the first type comprising a first filter embedded in the lens, the first filter attenuating a first light outside the visible wavelength spectrum incident on the face; the region of the second type lacking the first filter and reflecting the first light incident on the face to its source; wherein both the region of the first type and the region of the second type reflect light within the visible wavelength spectrum incident on the face to its source; and wherein the first light incident on the face is reflected to its source as a first pattern, the first pattern comprising encoded information.

In some embodiments, the existing reflective marker is a road marker, a road sign, or a vehicle marker. In some embodiments, the existing reflective marker is an aviation runway marker or an aircraft marker. In some embodiments, the existing reflective marker is a shipping lane marker, a ship marker, or a shipping container marker. In some embodiments, the existing reflective marker is a residential structure marker, a retail structure marker, a parking structure marker, or a warehouse marker.

In some embodiments, the marker lens further comprises a visual indicator on the face, wherein the visual indicator corresponds to at least one of the encoded information and the type. In some embodiments, the marker lens comprises two or more types of marker lenses. In some embodiments, the method further comprises at least one of determining and confirming the type of marker lens to apply to the existing reflective marker. In some embodiments, each of the two or more types of marker lenses differ by at least one of a shape, a size, a visual color, or the encoded information.

In some embodiments, the adhesive consists of a transparent adhesive. In some embodiments, the adhesive comprises a bottle, a tape, or a spray. In some embodiments, the adhesive comprises a light activated adhesive, an air activated adhesive, a pressure activated adhesive, or a temperature activated adhesive. In some embodiments, the adhesive comprises one or more parts. In some embodiments, the adhesive comprises a pre-applied adhesive on a surface of the marker lens. In some embodiments, preparing the surface of the existing reflective marker comprises removing a protective cover from a marker lens with an adhesive backing. In some embodiments, the method further comprises applying the adhesive to at least one of a surface of the marker lens and a surface of the existing reflective marker. In some embodiments, preparing the surface of the existing reflective marker comprises cleaning comprises cleaning the surface of the existing reflective marker with at least one of a cleaning solution and a cleaning tool. In some embodiments, preparing the surface allows for improved and consistent strength and durability of an adhesive.

In some embodiments, applying the adhesive to at least one of a surface of the marker lens and a surface of the existing reflective marker comprises applying the adhesive with at least one of a brush, a syringe, a stirrer, and an applicator.

In some embodiments, adhering the marker lens to the existing reflective marker comprises using at least one of a jig and a measuring element to position the marker lens on the existing reflective marker. In some embodiments, the method further comprises at least one of unwrapping the marker lens, unrolling the marker lens, separating a marker lens from a stack or sheet of marker lenses, and removing a protective cover from the marker lens.

In some embodiments, the jig is employed to ensure that the marker lens is accurately positioned onto the existing reflective marker such that no visual information on the existing reflective marker is obstructed and hidden, and such that the first laser and/or the second laser can reach and be reflected or diminished by the marker lens.

Filter

In some embodiments, the devices, systems, and media described herein include a region of a first type comprising a first filter and/or a second filter. In some embodiments, optical filters are devices that selectively transmit light of one or a range of wavelengths (colors). In some embodiments, a filter comprises a glass or plastic plane that is dyed or contains an interference coating, which is placed in the optical path of a light. In some embodiments, each dye has an optical density or absorbance of a set wavelength or range of wavelengths. In some embodiments, a dye within or atop a material is capable of attenuating a set wavelength or range of wavelengths while allowing others to pass. In some embodiments, the wavelength response of a filter specifies how the magnitude and phase of each wavelength component of an incoming signal is modified by the filter.

In some embodiments a filter comprises a long-pass filter, or a short-pass filter, which blocks long and short wavelengths, respectively. In some embodiments a passband may be narrower or wider; the transition or cutoff between maximal and minimal transmission can be sharp or gradual.

In some embodiments, the devices, systems, and media described herein include a region of a first type comprising a first filter, wherein the first filter is a polarizing filter, an interference filter, a physical filter, or any combination thereof. In some embodiments, a polarizing filter allow light to pass through a certain direction or range of directions, while blocking light from a direction or range of directions. In some embodiments, an interference filter or dichroic filter is an optical filter that reflects one or more spectral bands or lines and transmits others, while maintaining a nearly zero coefficient of absorption for all wavelengths of interest. In some embodiments, the interference filter is a high-pass, low-pass, bandpass, or band-rejection filter. In some embodiments, a physical filter comprises a grating or mesh that allows light to pass through in certain areas, but blocks light from passing through to other areas.

Many dyes are suitable for the devices and systems herein that absorb light at specific wavelengths or ranges of wavelengths, including those available from Sigma Aldrich, ADS dyes, QCR Solutions, and Epolin.

In various embodiments, the dye comprises $C_{32}H_{36}ClN_2I$, $C_{32}H_{36}N_2O_4Cl$, $C_{36}H_{44}ClN_2I$, $C_{36}H_{44}N_2O_4Cl_2$, $C_{34}H_{40}N_2O_6Cl_2$, $C_{39}H_{41}ClN_6S$, $C_{54}H_{54}N_2O_4S$, $C_{42}H_{44}IN_2Cl$, $C_{47}H_{47}ClN_2O_3S$, $C_{62}H_{92}N_6Sb_2F_{12}$, $C_{57}H_{48}N_4SbF_6$, $C_{38}H_{46}ClN_2O_6S_2Na$, $C_{43}H_{47}N_2O_6S_2Na$, $C_{44}H_{52}N_3O_6S_3Na$, $C_{38}H_{49}N_3O_6S_4Cl$, $C_{46}H_{51}N_2O_6S_2Cl$, $C_{52}H_{56}N_3O_6S_3Na$, {3-Ethyl-5-[(4-ethyl-3,5-dimethyl-2H-pyrrol-2-ylidene)methyl]-2,4-dimethyl-1H-pyrrolato-N1,N5}difluoroboron (HPLC), 1,1',3,3,3',3'-Hexamethylindotricarbocyanine iodide, 1,1'-Diethyl-2,2'-dicarbocyanine iodide, 1,1'-Diethyl-4,4'-carbocyanine iodide, 1,1'-Diethyl-4,4'-dicarbocyanine iodide, 1,3,5,7-Tetramethyl-8-phenyl-4,4-difluoroboradiazaindacene, 1,4,8,11,15,18,22,25-Octabutoxy-29H,31H-phthalocyanine, 2-(4-Biphenylyl)-5-phenyl-1,3,4-oxadiazole, 2,1,3-Benzoxadiazole-5-carboxylic acid (GC), 2,11,20,29-Tetra-tert-butyl-2,3-naphthalocyanine, 2,3,9,10,16,17,23,24-Octakis(octyloxy)-29H,31H-phthalocyanine, 2,3-Naphthalocyanine, 2,5-Bis(5-tert-butyl-benzoxazol-2-yl)thiophene suitable for scintillation, 2,5-Diphenyloxazole, suitable for scintillation, 2,8-Diethyl-1,3,5,7-tetramethyl-9-phenylbipyrromethene difluoroborate (HPLC), 2,9,16,23-Tetra-tert-butyl-29H,31H-phthalocyanine, 2-[4-(Dimethylamino)styryl]-1-methylpyridinium iodide, 29H,31H-Phthalocyanine β-form, 3,3'-Diethyloxacarbocyanine iodide, 3,3'-Diethylthiacarbocyanine iodide, 3,3'-Diethylthiadicarbocyanine iodide, 3,3'-Diethylthiatricarbocyanine iodide, 3,3'-Diethylthiatricarbocyanine perchlorate, 4-(Dicyanomethylene)-2-methyl-6-(4-dimethylaminostyryl)-4H-pyran, 4-Chloro-7-chlorosulfonyl-2,1,3-benzoxadiazole, 5-(4-Methoxyphenyl)-1,3,4-oxadiazole-2-thiol, 5-(4-Methylphenyl)-1,3,4-oxadiazole-2-thiol, 5-(4-Pyridyl)-1,3,4-oxadiazole-2-thiol, 5,9,14,18,23,27,32,36-Octabutoxy-2,3-naphthalocyanine, 5-Phenyl-1,3,4-oxadiazole-2-thiol, 7-Amino-4-methylcoumarin, 7-Diethylamino-4-methylcoumarin, Aluminum 1,8,15,22-tetrakis(phenylthio)-29H,31H-phthalocyanine chloride, Aluminum 2,9,16,23-tetraphenoxy-29H,31H-phthalocyanine chloride, Aluminum 2,9,16,23-tetraphenoxy-29H,31H-phthalocyanine hydroxide, Aluminum phthalocyanine chloride, Aluminum phthalocyanine hydroxide, Carbostyril 124, Cobalt(II) 1,2,3,4,8,9,10,11,15,16,17,18,22,23,24,25-hexadecafluoro-29H,31H-phthalocyanine, Cobalt(II) 2,3-naphthalocyanine, Cobalt(II) phthalocyanine β-form, Copper phthalocyanine-3,4',4'',4'''-tetrasulfonic acid tetrasodium salt, Copper(II) 1,2,3,4,8,9,10,11,15,16,17,18,22,23,24,25-hexadecafluoro-29H,31H-phthalocyanine, Copper(II) 1,4,8,11,15,18,22,25-octabutoxy-29H,31H-phthalocyanine, Copper(II) 2,3,9,10,16,17,23,24-octakis(octyloxy)-29H,31H-phthalocyanine, Copper(II) 2,3-naphthalocyanine, Copper (II) 2,9,16,23-tetra-tert-butyl-29H,31H-phthalocyanine, Copper(II) 5,9,14,18,23,27,32,36-octabutoxy-2,3-naphthalocyanine, Copper(II) phthalocyanine, Coumarin 6, Difluoro(4-(1,1-dimethylethyl)-2-{1-[4-(1,1-dimethylethyl)-3,5-dimethyl-2H-pyrrol-2-ylidene-N]ethyl}-3,5-dimethyl-1H-pyrrol-2-ylidene-N]ethyl}-3,5-dimethyl-1H-pyrrolato-N) boron (HPLC), Difluoro{2-[(3,5-dimethyl-2H-pyrrol-2-ylidene-N)methyl]-3,5-dimethyl-1H-pyrrolato-N}boron (HPLC), Difluoro{2-[1-(3,5-dimethyl-2H-pyrrol-2-ylidene-N)ethyl]-3,5-dimethyl-1H-pyrrolato-N}boron (HPLC), Difluoro{3-ethyl-5-[1-(4-ethyl-3,5-dimethyl-2H-pyrrol-2-ylidene-N)ethyl]-2,4-dimethyl-1H-pyrrolato-N}boron (HPLC), Dilithium phthalocyanine, Disodium phthalocyanine, Gallium(III)-phthalocyanine chloride, Indium(III) phthalocyanine chloride, Iron(II) phthalocyanine, Iron(III) phthalocyanine chloride, Iron(III) phthalocyanine-4,4',4'',4'''-tetrasulfonic acid, Lead(II) phthalocyanine, Lead(II) tetrakis(4-cumylphenoxy)phthalocyanine, Magnesium phthalocyanine, Manganese(II) phthalocyanine, Manganese(III) phthalocyanine chloride, Methylsilicon(IV) phthalocyanine hydroxide, Naphthol Green, Nickel(II) 1,4,8,11,15,18,22,25-octabutoxy-29H,31H-phthalocyanine, Nickel(II) 5,9,14,18,23,27,32,36-octabutoxy-2,3-naphthalocyanine, Nickel (II) phthalocyanine, Nickel(II) phthalocyanine-tetrasulfonic acid tetrasodium salt, Nile Blue A perchlorate, Oxazine 170 perchlorate, Pinacryptol yellow for photographic purposes, Poly(copper phthalocyanine), p-Quaterphenyl, Rhodamine 6G, Rhodamine 6G perchlorate, Silicon 2,3-naphthalocyanine bis(trihexylsilyloxide), Silicon 2,3-naphthalocyanine dichloride, Silicon 2,3-naphthalocyanine dihydroxide, Silicon 2,3-naphthalocyanine dioctyloxide, Silicon 2,9,16,23-tetra-tert-butyl-29H,31H-phthalocyanine dihydroxide, Silicon phthalocyanine dichloride, Silicon phthalocyanine dihydroxide, Solvent Blue 43, Styryl 9M, Sulforhodamine B, acid form laser grade, Sulforhodamine G, Tin(IV) 2,3-naphthalocyanine dichloride, Titanium(IV) phthalocyanine dichloride, Titanyl phthalocyanine, Titanyl phthalocyanine γ-modification, TokeOni, Vanadyl 2,11,20,29-tetra-tert-butyl-2,3-naphthalocyanine, Vanadyl 2,3-naphthalocyanine, Vanadyl 2,9,16,23-tetraphenoxy-29H,31H-phthalocyanine, Vanadyl 3,10,17,24-tetra-tert-butyl-1,8,15,22-tetrakis(dimethylamino)-29H,31H-phthalocyanine, Zinc 1,2,3,4,8,9,10,11,15,16,17,18,22,23,24,25-hexadecafluoro-29H,31H-phthalocyanine, Zinc 1,4,8,11,15,18,22,25-octabutoxy-29H, 31H-phthalocyanine, Zinc 2,11,20,29-tetra-tert-butyl-2,3-naphthalocyanine, Zinc 2,3,9,10,16,17,23,24-octakis (octyloxy)-29H,31H-phthalocyanine, Zinc 2,9,16,23-tetra-tert-butyl-29H,31H-phthalocyanine, Zinc phthalocyanine, Zinc(II) tetranitrophthalocyanine, or any combination thereof.

Laser

In some embodiments, the devices, systems, and media described herein include a region of a first type comprising a first filter attenuating a first laser. In some embodiments, a laser or a laser beam comprises a light whose coherency allows collimation, tight focusing over great distances. Some lasers have a high temporal coherence and comprise a narrow spectrum or a single wavelength of light. Some lasers comprise a collimated light whose rays are parallel, and therefore will spread minimally as it propagates.

In some embodiments, the reflective marker further comprises a region of a third type comprising a second filter embedded in the lens, the second filter attenuating a second laser having a wavelength outside the visible spectrum and different than that of the first laser.

In some embodiments, at least one of the first laser and the second laser are emitted by a LiDAR device. In some embodiments, the wavelength of at least one of the first laser and the second laser is between about 900 nanometers and about 1600 nanometers. In some embodiments, the wavelength of at least one of the first laser and the second laser fall within the invisible light spectrum. In some embodiments, the wavelength of at least one of the first laser and the second laser fall within the near infrared wavelength spectrum.

In some embodiments, the strength of a laser is attenuated when the laser passes through a filter.

Visible Wavelength Spectrum

In some embodiments, the devices, systems, and media described herein include a region of a first type comprising a first filter attenuating a first laser outside the visible wavelength spectrum. In some embodiments, the face further comprises a region of the third kind comprising a second filter, capable of attenuating a second laser having a second wavelength outside the visible wavelength spectrum. In some embodiments, the visible wavelength spectrum is the portion of the electromagnetic spectrum that is visible to the human eye, with a wavelength of from about 390 nm to about 700 nm and/or a frequency of from about 430 THz to about 770 THz, and/or about a photon energy of about 1.5 eV to about 3.3 eV.

Encoded Information

In some embodiments, the devices, systems, and media described herein comprise a face, wherein a first laser incident on the face is reflected to its source as a first pattern, wherein the face comprises a region of the first type comprising a first filter and a region of the second type lacking the first filter, wherein the first filter is capable of attenuating a first laser outside the visible wavelength spectrum incident on the face, and wherein the pattern comprises encoded information. In some embodiments, the face further comprises a region of the third kind comprising a second filter, capable of attenuating a second laser having a second wavelength outside the visible wavelength spectrum incident on the face as a second pattern and wherein the second pattern comprises encoded information.

In some embodiments, the encoded information in the first pattern is spatially encoded. In some embodiments, the spatial encoding comprises a one-dimensional encoding, a two-dimensional encoding, a three-dimensional encoding, or any combination thereof. In some embodiments, the spatial encoding comprises a three-dimensional encoding, wherein the marker device comprises a plurality of faces, and wherein a distance between at least two of the plurality of faces encodes information. In some embodiments, the spatial encoding comprises a QR code, a bar code, a pattern, an array, a two-dimensional shape, a three-dimensional shape, a number, a letter, a symbol, or any combination thereof. In some embodiments, the reflective marker device of comprises a plurality of faces, wherein at least two of the plurality of faces are non-coplanar. In some embodiments, the at least two non-coplanar faces are parallel. In some embodiments, the at least two non-coplanar faces are offset by an offset distance of about 0.01 inches to about 3 inches.

In some embodiment a shape of at least one of the first region, the second region, and the third region comprises a circle, an oval, an arch, an ellipse, a triangle, a square, a polygon, an amorphous shape, or any combination thereof. In some embodiments, the pattern comprises a one-dimensional pattern (e.g. a linear bar code), a two-dimensional pattern (e.g. a QR code), a three-dimensional pattern, or any other possible arrangement of shapes capable of conveying information to a computer through a mechanical vision hardware. In some embodiments, the shapes and/or patterns are non-temporal and constant.

In some embodiments, a one-dimensional pattern comprises a binary pattern. In some embodiments, the binary pattern comprises a bar code. In some embodiments, the bar code is capable of encoding at least about 0.4 bits per millimeter, at least about 0.4 bits per millimeter, at least about 0.6 bits per millimeter, at least about 0.7 bits per millimeter, or at least about 0.8 bits per millimeter.

In some embodiments, at least one of the first pattern and the second pattern comprise a two-dimensional pattern. In some embodiments, the two-dimensional pattern comprises a QR code. There are currently 40 versions of QR codes capable of storing a two-dimensional array of between 21×21 bits and 177×177 bits. In some embodiments, a QR code can encode for numeric characters, alphanumeric characters, binary characters, kanji/kana characters, or any combination thereof. In some embodiments, the amount of information that can be encoded per area with a QR code depends on the resolution of the QR code printer and the resolution of the laser.

In some embodiments, the face comprises a plurality of faces, wherein the distance between each face further encodes information.

Figure 7A:
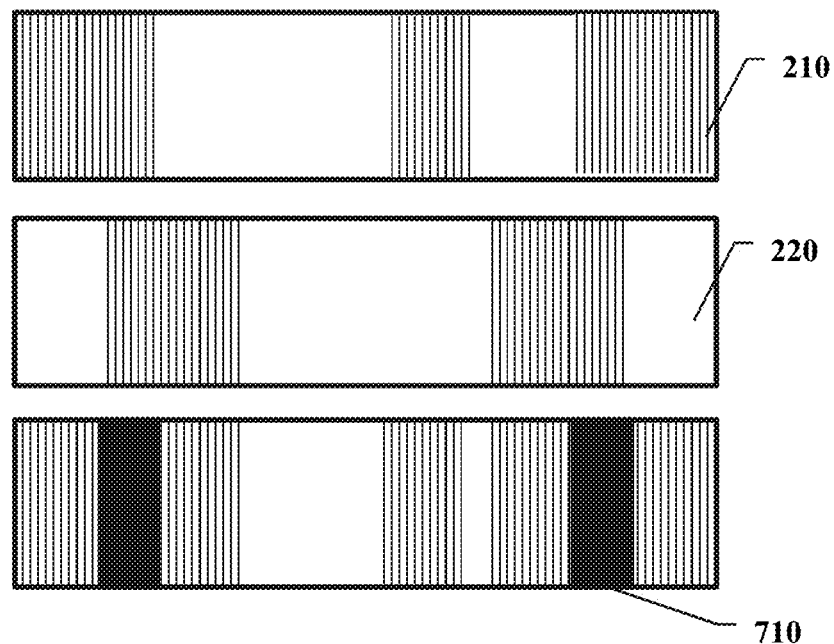
FIG. 7A shows a non-limiting illustration of an exemplary reflective marker device comprising a region of the first type, a region of the second type, and a stacked portion.

A non-limiting illustration of an exemplary reflective marker device comprising a face is shown in FIG. 7A, wherein the first laser incident on the face is reflected to its source as a one dimensional first pattern, wherein the face comprises a region of the first type 210 comprising a first filter and a region of the second type 220 lacking the first filter, wherein the first filter is capable of attenuating a first laser outside the visible wavelength spectrum incident on the face, and wherein the one-dimensional first pattern comprises encoded information.

In some embodiments, the face comprises one or more portions of the first type 210 that are covered by one layer of the first filter, which are capable of attenuating the first laser with a first set intensity, and one or more stacked portions 710 of the first type that are covered by two layers of the first filter, which are capable of attenuating the first laser with a second set intensity of about twice the first set intensity, and wherein each intensity in the one-dimensional first pattern encodes information.

In some embodiments, the region of the first type 210 comprises more than two layers of the first filter, wherein the one-dimensional first pattern comprises two or more sets of intensities, wherein each intensity in the one-dimensional first pattern encodes information.

In some embodiments, a one-dimensional first pattern comprising X number of set intensities and Y number of discernable horizontal segments of regions of the first or second type can encode $(X+1)^Y$ number of bits.

In some embodiments, the face comprises a region of the first type 120 comprising a first filter, a region of the second type 220 lacking the first filter, and a region of the third kind 720 comprising a second filter, wherein the first filter is capable of attenuating a first laser having a first wavelength outside the visible wavelength spectrum incident on the face as a one-dimensional first pattern, wherein the second filter is capable of attenuating a second laser having a second wavelength outside the visible wavelength spectrum incident on the face as a one-dimensional second pattern and wherein the one-dimensional pattern comprises encoded information.

In some embodiments, a source is capable of emitting and receiving either the first laser or the second laser, wherein the one-dimensional first or second pattern comprises Z number of discernable horizontal segments can encode $(2)^{(Z)}$ number of bits. In one non-limiting example, a first source associated with a passenger vehicle is capable of emitting the first laser and receiving the first laser as a one-dimensional first pattern encoding travel and safety information, wherein, a second source associated with an emergency vehicle is capable of emitting the second laser and receiving the second laser as a one-dimensional second pattern encoding emergency resource information.

In some embodiments, a source is capable of emitting and receiving both the first laser and the second laser, and employing a digital processor to overlay the first one-dimensional pattern and the second one-dimensional pattern. In some embodiments, the one-dimensional first and second patterns comprise Z number of discernable horizontal segments can encode $(4)^{(Z)}$ number of bits.

Figure 7B:
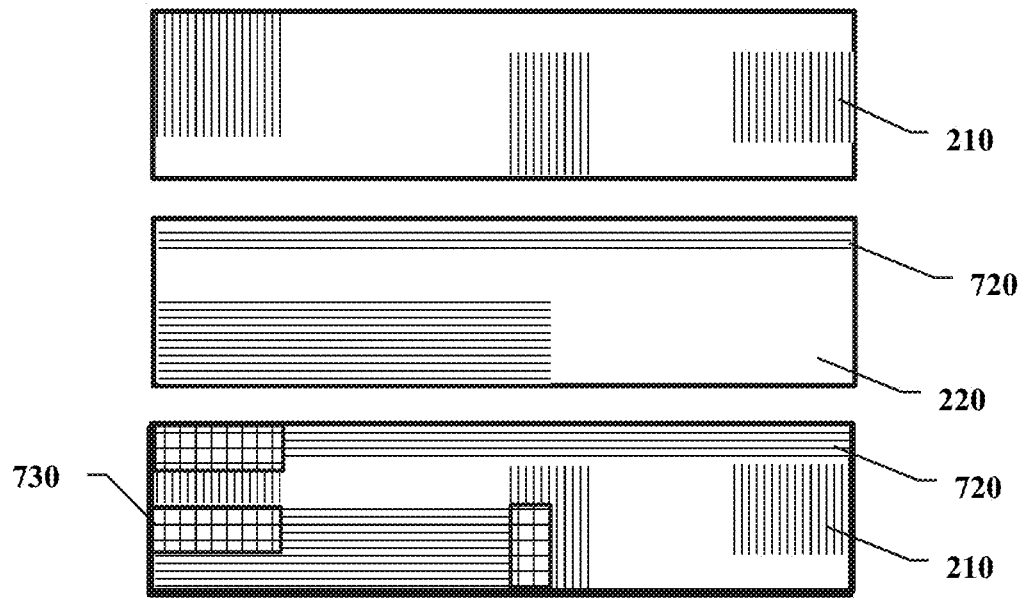
FIG. 7B shows a non-limiting illustration of an exemplary reflective marker device comprising a region of the first type, a region of the second type, and a stacked portion.

A non-limiting illustration of an exemplary reflective marker device comprising a face is shown in FIG. 7B, wherein the first laser incident on the face is reflected to its source as a two-dimensional first pattern, wherein the face comprises a region of the first type 210 comprising a first filter and a region of the second type 220 lacking the first filter, wherein the first filter is capable of attenuating a first laser outside the visible wavelength spectrum incident on the face, and wherein the two-dimensional first pattern comprises encoded information.

In some embodiments, the face comprises a region of the first type 120 comprising a first filter, a region of the second type 220 lacking the first filter, and a region of the third kind 720 comprising a second filter, wherein the first filter is capable of attenuating a first laser having a first wavelength outside the visible wavelength spectrum incident on the face as a two-dimensional first pattern, wherein the second filter is capable of attenuating a second laser having a second wavelength outside the visible wavelength spectrum incident on the face as a two-dimensional second pattern and wherein the two-dimensional pattern comprises encoded information.

In some embodiments, a source is capable of emitting and receiving either the first laser or the second laser, wherein the two-dimensional pattern comprises Q number of discernable horizontal segments and R number of discernable vertical segments can encode $(2)^{(Q*R)}$ number of bits.

In some embodiments, a source is capable of emitting and receiving both the first laser and the second laser, and employing a digital processor to overlay the first one-dimensional pattern and the second one-dimensional pattern. In some embodiments, a source is capable of emitting and receiving both the first laser and the second laser simultaneously or consecutively. In some embodiments, the one-dimensional first and the second pattern each comprise Q number of discernable horizontal segments and R number of discernable vertical segments can encode $(4)^{(Q*R)}$ number of bits.

In some embodiments, the face comprises a region of the first type 120 comprising a first filter, a region of the second type 220 lacking the first filter, and a region of the third kind 720 comprising a second filter, wherein at least one of the region of the first type 120, and the region of the third type 720, comprises a stacked portion 710. In some embodiments, the face further comprises regions of the third type, or additional region types, wherein each region type comprises a respective filter capable of attenuating a respective laser incident on the face and reflecting the laser to its source as a respective pattern.

In some embodiments, at least one of the first pattern and the second pattern are capable of encoding at least about 0.16 bits per square millimeter. In some embodiments, the regions of the third type, the fourth type, or other types are each capable of encoding at least about 0.16 bits per square millimeter, at least about 0.2 bits per square millimeter, at least about 0.25 bits per square millimeter, or at least about 0.3 bits per square millimeter.

Figure 10:
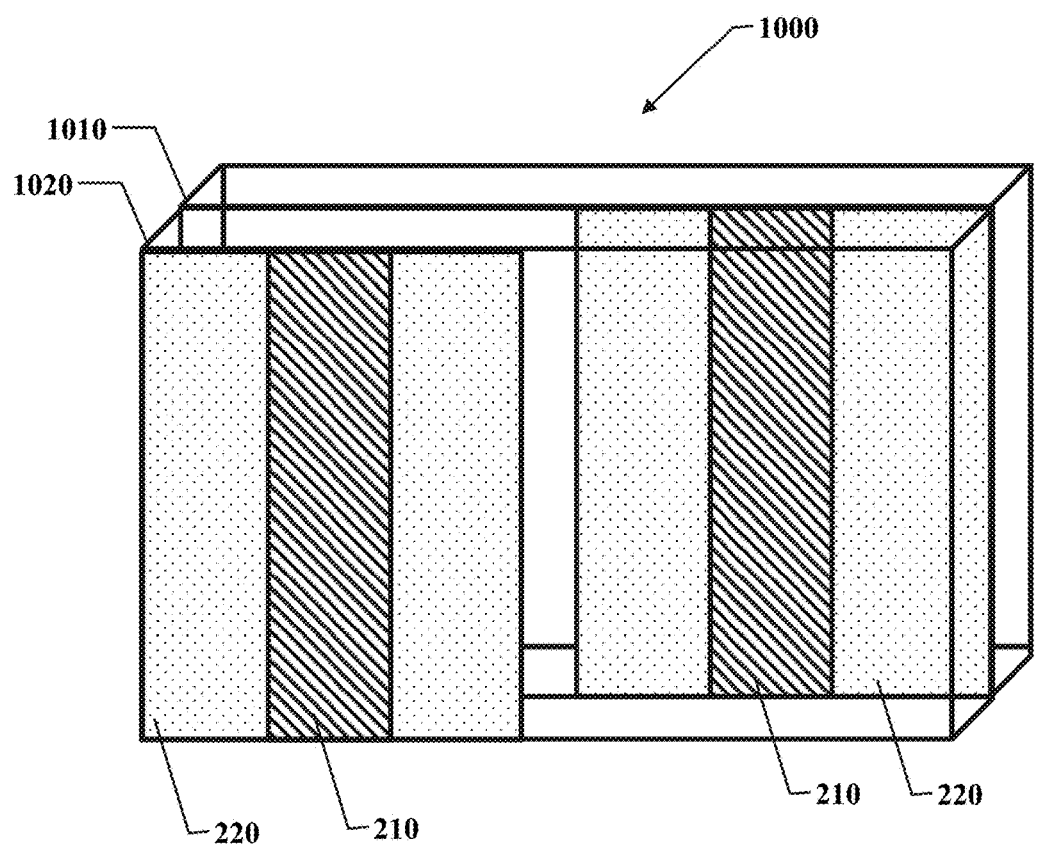
FIG. 10 shows a non-limiting illustration of a perspective view of an exemplary reflective marker kit comprising a first face and a second face.

A non-limiting illustration of an exemplary reflective marker device comprising a first face 1010 comprising a first retroreflective surface and a first lens, and a second face 1020 comprising a second retroreflective surface and a second lens is shown in FIG. 10, wherein the first face 1010 and the second face 1020 are non-coplanar, and offset by an offset distance. In some embodiments, the first face 1010 comprises a region of the first type 210, and a region of the second type 220. In some embodiments, the second face 1020 comprises a region of the first type 210, and a region of the second type 220. In some embodiments, both the first face 1010 and the second face 1020 comprise a region of the first type 210, and a region of the second type 220.

In some embodiments, the retroreflective device comprises a first transparent sheet, and a second transparent sheet, wherein the first face 1010 and the second face 1020 comprise a portion of the first and second transparent sheets, respectively. In some embodiments, a portion of the second face 1020 obscures a portion of the first face 1010. In these embodiments, at least one of the first laser and the second laser passes through the portion of the second transparent sheet not comprising the first face 1010, and is attenuated by the region of the first kind 201, or is reflected by the region of the second kind 210.

It can be easily determined that one of ordinary skill in the art would understand that, in light of the disclosure provided herein, the data encoding resolution is limited by the state of the art of laser and LiDAR technology, and that further developments in such fields could reduce the encoding resolution with improved sensing capabilities.

In some embodiments, the encoded information comprises navigational information comprising a speed limit, a direction of travel, a location, or any combination thereof. In some embodiments, the encoded information comprises non-navigational information such as, for example, advertising information.

In some embodiments, the visual color of the reflective marker conveys information to observers wherein, for example, a white marker conveys a lane demarcation between two lanes traveling in the same direction, a yellow marker conveys a lane demarcation between two lanes traveling in the opposite direction, and a blue marker coveys a fire hydrant or emergency lane. In some embodiments, the color of one face differs from the color of another face of the reflective marker, wherein, for example, the side of the reflective marker in the direction of traffic is white, and wherein the side of the reflective marker in the direction opposite traffic is red.

LiDAR Systems

In some embodiments, the LiDAR device is capable of emitting a laser beam and measuring a time-of-flight of the laser beam, the intensity of the returned laser beam, or both. In some embodiments, the time-of-flight comprises a time period between the emission and receipt of the laser beam. In some embodiments, the LiDAR uses the time-of-flight to measure a distance from the LiDAR sensor.

In some embodiments, a LiDAR is employed on an autonomous vehicle to sense the surrounding environment, such that a computer aboard the autonomous vehicle can determine an optimal navigational path.

Existing Reflective Markers

Some embodiments herein comprise a kit for retrograding an existing retroreflective surface. In some embodiments, the existing reflective marker is a road marker, a road sign, or a vehicle marker. In some embodiments, the existing reflective marker is an aviation runway marker or an aircraft marker. In some embodiments, the existing reflective marker is a shipping lane marker, a ship marker, or a shipping container marker. In some embodiments, the existing reflective marker is a residential structure marker, a retail structure marker, a parking structure marker, or a warehouse marker.

In some embodiments, the existing reflective marker is any existing retroreflective surface. In some embodiments the existing reflective marker does not contain a filter capable of attenuating a light outside the visual wavelength spectrum. In some embodiments, the existing retroreflective surface comprises a fixed surface. In some embodiments, the existing retroreflective surface comprises a moving surface. In some embodiments, the existing retroreflective surface comprises a rigid surface. In some embodiments the existing retroreflective surface comprises a flexible surface.

One of ordinary skill in the art would easily recognize that the existing reflective marker may comprise any reflective or retroreflective surface that is currently used to convey visual information.

Fasteners

Some embodiments herein comprise a fastener adapted to attach a marker lens to an existing reflective marker. In some embodiments, the fastener comprises a screw, a nut, a nail, a threaded hole, an unthreaded hole, an adhesive, an epoxy, a cement, a crimp, a rivet, a tie, or any combination thereof. In some embodiments, the fastener consists of an adhesive. In some embodiments, the fastener consists of a transparent adhesive. In some embodiments, the adhesive comprises a bottle, a tape, a patch, or a spray. In some embodiments, the adhesive comprises a light activated adhesive, an air activated adhesive, a pressure activated adhesive, or a temperature activated adhesive. In some embodiments, the adhesive comprises one or more parts.

One of ordinary skill in the art would appreciate that any known or currently used fastener can be employed to attach a marker lens to an existing reflective marker. In some embodiments, the fastener is easily applied to at least one of the existing reflective marker and the marker lens. In some embodiments, the fastener can withstand forces, water, and chemicals applied to the existing reflective marker or the marker lens throughout their lifetime of use. In some embodiments, the fastener can be easily and consistently applied to a multitude of existing reflective markers or the marker lenses.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

As used herein, the term "attenuating" refers to a reduction of the intensity of a beam.

As used herein, the term "jig" refers to a tool capable of defining a spatial relationship between two or more parts to enable repeatable and accurate processing or modification of the two or more parts.

As used herein, the term "near infrared wavelength spectrum" refers to electromagnetic radiation (EMR) with longer wavelengths than those of visible light, that extends from the nominal red edge of the visible spectrum at 700 nanometers (frequency of 430 THz), to 1 mm (frequency of 300 GHz).

As used herein, the term "non-coplanar" refers to the property of not existing on the same three-dimensional plane. In some embodiments, two non-coplanar planes are parallel to each other, are offset by a normal distance, and do not intersect. In some embodiments, two non-coplanar planes intersect at a line.

EXAMPLES

The following illustrative examples are representative of embodiments of the software applications, systems, and methods described herein and are not meant to be limiting in any way.

Example 1—Roadway

In one example, an autonomous vehicle is driving down a roadway during a rainstorm when sign visibility is low. As the vehicle approaches a sharp turn, its headlights illuminate a series of reflective markers on the road, wherein the visible light from the headlights is reflected back for the driver to see and wherein laser light outside the visible wavelength spectrum emitted from the autonomous vehicle's Light Detection and Ranging (LiDAR) system is reflected by only the reflective marker's one or more regions of the second type, wherein the reflected light is captured by the LiDAR system. A computer comprising at least one processor attached to the LiDAR system analyzes the pattern and/or shapes of the regions of the second type and determines that marker encodes a turn radius of the curve ahead. As a result, the computer instructs the vehicle to reduce its speed before the slick sharp turn ahead.

Example 2—Multiple Layers of Encoding

Figure 8A:
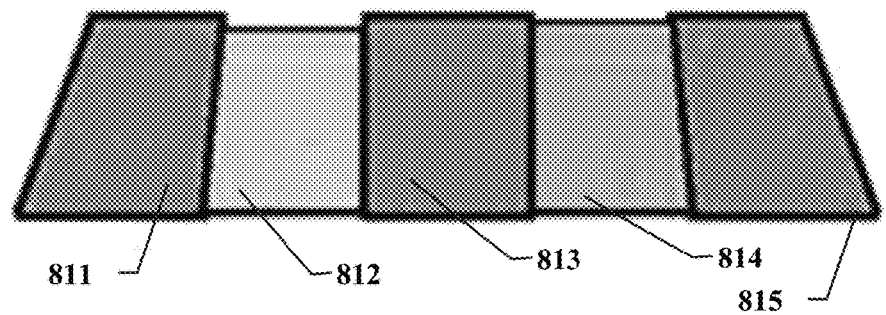
FIG. 8A shows a non-limiting illustration of a front view of an exemplary reflective marker device comprising a three-dimensional spatial encoding pattern.
Figure 8B:
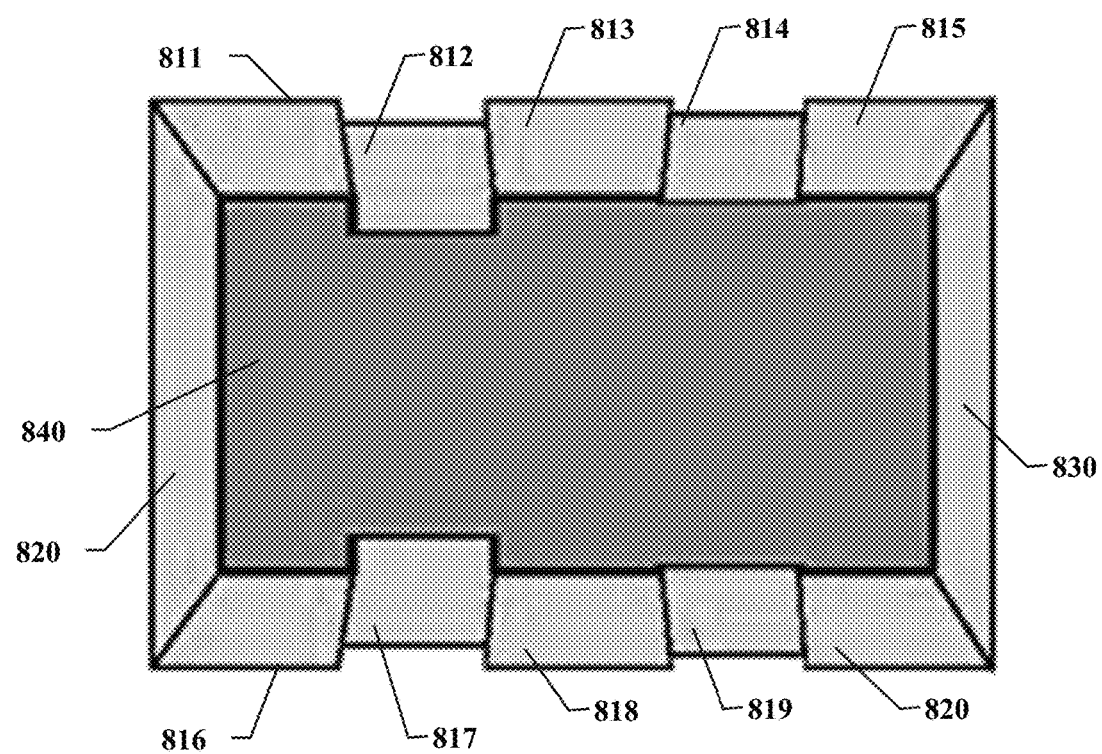
FIG. 8B shows a non-limiting illustration of a top view of an exemplary reflective marker device comprising a three-dimensional spatial encoding pattern.

In another example, a suitable reflective marker, as shown in FIGS. 8A and 8B, comprises a retroreflective surface and a lens covering the retroreflective surface to form a left face 820, a right face 830, a top face 840, a first front face 811, a second front face 812, a third front face 813, a fourth front face 814, a fifth front face 815, a first back face 816, a second back face 817, a third back face 818, a fourth back face 819, and fifth back face 820. In one example, at least one of the faces comprises at least one of a region of the first type, a region of a second type, and a region of the third type, wherein the region of the first type comprises a first filter capable of attenuating a first laser outside the visible wavelength spectrum incident on the face, wherein the region of the second type lacks the first filter and reflecting the first laser incident on the face to its source, wherein the third filter is capable of attenuating a second laser outside the visible wavelength spectrum having a different wavelength than the first laser, incident on the face, and wherein the region of the first type, the region of the second type, and the region of the third type reflect light within the visible wavelength spectrum incident on the face to its source.

In some embodiments, the first laser and the second laser incident on one or more of the faces is reflected to its source as a first pattern and a second pattern respectively, wherein each pattern comprises encoded information, and wherein the encoded information in the first pattern is spatially encoded.

In some embodiments each of the front faces 811, 812, 813, 814, 815 are parallel to each other. In some embodiments each of the back faces 816, 817, 818, 819, 820 are parallel to each other. In some embodiments neither the front faces 811, 812, 813, 814, 815, nor the back faces are parallel to each other 816, 817, 818, 819, 820. In some embodiments, the distance between each the front faces 811, 812, 813, 814, 815 or each of the back faces 816, 817, 818, 819, 820 can be measured by a LiDAR apparatus.

In this example, the exemplary reflective marker of, is capable of encoding information both in a pattern formed by the regions of the first, second, and third type on each of the front and back faces, and by the distance between each of front faces or each of the back faces.

As a non-limiting example, the patterns of the regions of the first, second and third type, and the distances between the front faces can encode information for cars headed in one direction, while the patterns of the regions of the first, second and third type, and the distances between the back faces can encode information for cars headed in an opposite direction.

Example 3—Kit for Retrofitting an Existing Reflective Marker

In another example, a district wants to upgrade their current infrastructure for improved and increased use of autonomously driven cars. A worker employs a kit comprising a marker lens and an adhesive to add notifications and messages that only a LiDAR or autonomous car can read, to existing signs within the district. The worker applies the adhesive to the back of the marker lens, or removes a protective sheet from the an adhesive pre-applied to the back of the marker lens, and fastens the marker lens to a road marker, a road sign, a vehicle, an aviation runway, an aircraft, a shipping lane, a ship, a shipping container, a residential structure, a retail structure, a parking structure, or a warehouse.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A reflective marker device comprising:
    a) a retroreflective surface and a lens covering the retroreflective surface to form a face;
    b) the face comprising a plurality of regions, the plurality of regions comprising at least a region of a first type and a region of a second type;
    c) the region of the first type comprising a first filter embedded in the lens, the first filter attenuating a light of a first laser having a first source and a wavelength outside a visible wavelength spectrum incident on the face; and
    d) the region of the second type lacking the first filter and reflecting the light of the first laser incident on the face to the first source;
        wherein both the region of the first type and the region of the second type reflect light within the visible wavelength spectrum incident from the face to the first source; and
        wherein the light of the first laser incident on the face is reflected to the first source as a first pattern, the first pattern comprising encoded information.

2. The reflective marker device of claim 1, comprising at least 2 regions of the first type or the second type.

3. The reflective marker device of claim 1, wherein the lens comprises glass, polycarbonate, plastic, or any combination thereof.

4. The reflective marker device of claim 1, wherein the first filter comprises an absorptive dye, a polarizing filter, an interference filter, a physical filter, or any combination thereof.

5. The reflective marker device of claim 1, wherein the light of the first laser has a wavelength between 893 nm and 913 nm or between 1540 nm and 1560 nm.

6. The reflective marker device of claim 1, wherein the encoded information in the first pattern is spatially encoded.

7. The reflective marker device of claim 6, wherein the spatial encoding comprises two-dimensional encoding.

8. The reflective marker device of claim 7, wherein the two-dimensional encoding comprises a QR code, a pattern, an array, a shape, a number, a letter, a symbol, or any combination thereof.

9. The reflective marker device of claim 6, wherein the spatial encoding comprises three-dimensional encoding.

10. The reflective marker device of claim 9, wherein the three-dimensional encoding comprises a pattern, an array, a shape, a number, a letter, a symbol, or any combination thereof.

11. The reflective marker device of claim 1, wherein the encoded information is non-temporally encoded.

12. The reflective marker device of claim 1, comprising a plurality of faces, wherein at least two of the plurality of faces are non-coplanar.

13. The reflective marker device of claim 12, wherein the at least two non-coplanar faces are parallel.

14. The reflective marker device of claim 12, wherein the at least two non-coplanar faces are offset by an offset distance of about 0.01 inches to about 3 inches.

15. The reflective marker device of claim 12, wherein a distance between at least two of the non-coplanar faces encodes information.

16. The reflective marker device claim 1, further comprising a region of a third type comprising a second filter embedded in the lens, the second filter attenuating a light of a second laser having a second source and a wavelength outside the visible spectrum and different than that of the first laser incident on the face and reflecting light having a wavelength within the visible spectrum incident from the face to the second source such that light of the second laser incident on the face is reflected to the second source as a second pattern, the second pattern comprising encoded information.

17. The reflective marker device of claim 16, wherein the second filter comprises an absorptive dye, a polarizing filter, an interference filter, a physical filter, or any combination thereof.

18. The reflective marker device of claim 16, wherein the light of the second laser has a wavelength between 893 nm and 913 nm or between 1540 nm and 1560 nm.

19. The reflective marker device of claim 1, wherein the device is passive.

20. The reflective marker device of claim 1, wherein the device is non-mechanical and non-electronic.

21. A system comprising:
   a) a LiDAR apparatus configured to transmit at least a light of a first laser into an environment, the light of the first laser having a wavelength outside the visible wavelength spectrum;
   b) at least one reflective marker device positioned in the environment wherein the reflective marker device comprises:
      a retroreflective surface and a lens covering the retroreflective surface to form a face;
      the face comprising a plurality of regions, the plurality of regions comprising at least a region of a first type and a region of a second type;
      the region of the first type comprising a first filter associated with the lens, the first filter attenuating the light of the first laser incident on the face; and
      the region of the second type lacking the first filter and reflecting the light of the first laser incident from the face to the LiDAR;
      wherein both the region of the first type and the region of the second type reflect light within the visible wavelength spectrum incident from the face; and
      wherein the light of the first laser incident on the face is reflected to the LiDAR as a first pattern, the first pattern comprising encoded information;
   c) a receiver positioned within the LiDAR and configured to receive the reflected light of the first laser and the first pattern; and
   d) a computer comprising at least one processor configured to decode the encoded information.

22. The system of claim 21, wherein the LiDAR is mounted on an autonomous vehicle.

23. The system of claim 21, wherein the first filter of the reflective marker comprises an absorptive dye, a polarizing filter, an interference filter, a physical filter, or any combination thereof.

24. The system of claim 21, wherein the encoded information in the first pattern is spatially encoded.

25. The system of claim 24, wherein the spatial encoding comprises two-dimensional encoding.

26. The system of claim 25, wherein the two-dimensional encoding comprises a QR code, a pattern, an array, a shape, a number, a letter, a symbol, or any combination thereof.

27. The system of claim 24, wherein the spatial encoding comprises three-dimensional encoding.

28. The system of claim 27, wherein the three-dimensional encoding comprises a pattern, an array, a shape, a number, a letter, a symbol, or any combination thereof.

29. The system of claim 21, wherein the LiDAR apparatus is configured to transmit a light of a second laser into the environment, the light of the second laser having a wavelength outside the visible wavelength spectrum, and wherein the reflective marker further comprises a region of a third type comprising a second filter embedded in the lens, the second filter attenuating the light of the second laser having a wavelength outside the visible spectrum and different than that of the light of the first laser incident on the face and reflecting light having a wavelength within the visible spectrum incident from the face such that the light of the second laser incident on the face is reflected as a second pattern, the second pattern comprising encoded information.

30. The system of claim 29, wherein the second filter comprises an absorptive dye, a polarizing filter, an interference filter, a physical filter, or any combination thereof.

* * * * *